(12) United States Patent
Zhang et al.

(10) Patent No.: US 12,389,037 B2
(45) Date of Patent: *Aug. 12, 2025

(54) USE OF SECONDARY TRANSFORM IN CODED VIDEO

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,131

(22) Filed: Mar. 30, 2023

(65) Prior Publication Data

US 2023/0262263 A1    Aug. 17, 2023

Related U.S. Application Data

(63) Continuation of application No. 17/406,242, filed on Aug. 19, 2021, now Pat. No. 11,647,229, which is a (Continued)

(30) Foreign Application Priority Data

Apr. 23, 2019 (CN) ................ 2019/083853

(51) Int. Cl.
*H04N 11/02* (2006.01)
*H04N 19/11* (2014.01)
(Continued)

(52) U.S. Cl.
CPC ............. *H04N 19/61* (2014.11); *H04N 19/11* (2014.11); *H04N 19/124* (2014.11);
(Continued)

(58) Field of Classification Search
CPC ...... H04N 19/61; H04N 19/11; H04N 19/124; H04N 19/132; H04N 19/159; H04N 19/176; H04N 19/186; H04N 19/70
(Continued)

(56) References Cited

U.S. PATENT DOCUMENTS 5,822,004 A    10/1998    Crocitti
6,389,072 B1    5/2002    Tzou
(Continued)

FOREIGN PATENT DOCUMENTS

CN    104025589 A    9/2014
CN    105516730 A    4/2016
(Continued)

OTHER PUBLICATIONS

Siekmann et al. "CE6-Related: Simplification of the Reduced Secondary Transform," Joint Video Experts Team JVET) of ITU-T SG 16 WP 3 and ISO/IEC JTC 1/SC 29/WG 11, 14th Meeting, Geneva, CH, Mar. 19-27, 2019, document JVET-N0555, 2019.
(Continued)

*Primary Examiner* — Jayanti K Patel
*Assistant Examiner* — Richard B Carter
(74) *Attorney, Agent, or Firm* — Conley Rose, P.C.

(57) ABSTRACT

A video processing method includes determining, for a conversion between a block of a video and a bitstream representation of the video, that a secondary transform with a reduced dimension dimension (e.g., an inverse low frequency non-separable transform) is applicable to a single sub-block of the block in case a dimension of the block satisfies a condition. The secondary transform is performed
(Continued)

between a forward primary transform and a quantization step or between a de-quantization step and an inverse primary transform. The reduced dimension is reduced from a dimension of the block. The method also includes performing the conversion based on the determining.

20 Claims, 31 Drawing Sheets

Related U.S. Application Data continuation of application No. PCT/CN2020/086444, filed on Apr. 23, 2020.

(51) Int. Cl.
  H04N 19/124   (2014.01)
  H04N 19/132   (2014.01)
  H04N 19/159   (2014.01)
  H04N 19/176   (2014.01)
  H04N 19/186   (2014.01)
  H04N 19/61    (2014.01)
  H04N 19/70    (2014.01)

(52) U.S. Cl.
  CPC ......... *H04N 19/132* (2014.11); *H04N 19/159* (2014.11); *H04N 19/176* (2014.11); *H04N 19/186* (2014.11); *H04N 19/70* (2014.11)

(58) Field of Classification Search
  USPC .................................................. 375/240.03
  See application file for complete search history.

(56) References Cited

U.S. PATENT DOCUMENTS

| | | | |
|---|---|---|---|
| 10,666,976 | B2 | 5/2020 | Huang et al. |
| 11,647,229 | B2* | 5/2023 | Zhang ................. H04N 19/176 375/240.03 |
| 2002/0044605 | A1 | 4/2002 | Nakamura |
| 2004/0264571 | A1 | 12/2004 | Zhang |
| 2013/0003856 | A1 | 1/2013 | Saxena |
| 2014/0254676 | A1 | 9/2014 | Jiang |
| 2016/0050422 | A1 | 2/2016 | Rosewarne |
| 2017/0094313 | A1 | 3/2017 | Zhao |
| 2018/0041776 | A1 | 2/2018 | Kim |
| 2018/0103252 | A1 | 4/2018 | Hsieh |
| 2018/0302631 | A1 | 10/2018 | Chiang |
| 2018/0338143 | A1 | 11/2018 | Fracastoro |
| 2018/0367814 | A1 | 12/2018 | Seregin |
| 2019/0028701 | A1 | 1/2019 | Yu |
| 2019/0141334 | A1 | 5/2019 | Lim |
| 2019/0356915 | A1* | 11/2019 | Jang ..................... H04N 19/176 |
| 2020/0288134 | A1 | 9/2020 | Lim |
| 2020/0288172 | A1 | 9/2020 | Huang |
| 2020/0322617 | A1* | 10/2020 | Zhao ..................... H04N 19/119 |
| 2021/0321134 | A1* | 10/2021 | Koo ...................... H04N 19/91 |
| 2021/0352326 | A1 | 11/2021 | Lim |
| 2022/0109876 | A1 | 4/2022 | Zhang |
| 2022/0159300 | A1 | 5/2022 | Chiang |
| 2022/0182675 | A1 | 6/2022 | Zhang |
| 2022/0201335 | A1 | 6/2022 | Chiang |
| 2022/0345744 | A1 | 10/2022 | Leleannec |

FOREIGN PATENT DOCUMENTS

| | | |
|---|---|---|
| CN | 108141594 A | 6/2018 |
| CN | 108141596 A | 6/2018 |
| CN | 108141597 A | 6/2018 |
| CN | 108322745 A | 7/2018 |
| CN | 108632611 A | 10/2018 |
| CN | 108712649 A | 10/2018 |
| CN | 109076222 A | 12/2018 |
| CN | 109076226 A | 12/2018 |
| CN | 109076230 A | 12/2018 |
| CN | 109076242 A | 12/2018 |
| CN | 109076243 A | 12/2018 |
| CN | 109644269 A | 4/2019 |
| CN | 110636313 B | 7/2022 |
| EP | 3349451 A1 | 7/2018 |
| EP | 3506634 A4 | 8/2019 |
| JP | 7509944 B2 | 7/2024 |
| KR | 20180041578 A | 4/2018 |
| KR | 20210120802 A | 10/2021 |
| KR | 102321394 B1 | 11/2021 |
| WO | 2017195555 A1 | 11/2017 |
| WO | 2017195666 A1 | 11/2017 |
| WO | 2018037737 A1 | 3/2018 |
| WO | 2018166429 A1 | 9/2018 |
| WO | 2018174402 A1 | 9/2018 |
| WO | 2019022099 A1 | 1/2019 |
| WO | 2020046092 A1 | 3/2020 |
| WO | 2021194052 A1 | 9/2021 |

OTHER PUBLICATIONS

Koo et al. "CE6-5.1: Reduced Secondary Transform (RST)," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0292, 2019.

Zhao et al. "TU-Level Non-Separable Secondary Transform," Joint Video Exploration Team (JVET) of ITU-T SG 16 WP 3 and ISO/IEC JTC 1/SC 29/1/VG 11, 2nd Meeting, San Diego, USA, Feb. 20-26, 2016, document JVET-B0059, 2016.

Xinzzhao, From HEVC to VVC Evolution of Transform Technology (2)—Secondary Transform; retrieved from the Internet on Jun. 24, 2021 <URL: https:/lcloud.tencent.com/developer/article/1427150>, May 16, 2019.

Koo et al. "Low Frequency Non-Separable Transform (LFNST)," 2019 Picture Coding Symposium (PCS), Jan. 9, 2020.

Zhao et al. "NSST: Non-Separable Secondary Transforms for Next Generation Video Coding," 2016 Picture Coding Symposium (PCS), Apr. 24, 2017.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, documentJVET-N1001, 2019.

Retrieved from the internet: vcgit.hhi.fraunhofer.de/jvet/VVCSoftware_VTM/tags/VTM-4.0, Nov. 12, 2021.

De-Luxan-Hernandez et al. "CE3: Intra Sub-Partitions Coding Mode {Tests 1.1.1 and 1.1.2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0102, 2019.

Abdoli et al. ""CEB: BDPCM with HorizontalNertical Predictor and Independently Decodable Areas (test 8.3.1b),"" Joint Video Experts Team (JVET)of ITU-T SG 16 WP 3 and ISO/IEC JTC 1/SC 29/WG 1113th Meeting: Marrakech, MA. 9—Jan. 18, 2019, document JVET-M0057, 2019.

Karczewicz et al. "CE8-Related: Quantized Residual BDPCM," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0413, 2019.

Koo et al. "CE6: Reduced Secondary Transform (RST) {CE6-3.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0193, 019.

Salehifar et al. "CE 6.2.6: Reduced Secondary Transform (RST)," Joint Video Experts Team (JVET) of ITU-T SG 6 WP 3 and ISO/IEC JTC 1/SC 29/WG 11, 11th Meeting, Ljubljana, SI, Jul. 10-18, 2018, document JVET-K0099, 2018.

Koo et al. "CE6-2.1: Reduced Secondary Transform (RST)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0133, 2018.

Pfaff et al. "CE3: Affine Linear Weighted Intra Prediciton {CE3-4.1, CE3-4.2)," Joint Video Experts Team (JVET) of ITU-T SG 16 WP

(56) References Cited

OTHER PUBLICATIONS 3 and ISO/IEC JTC 1/SC 29/WG 11, 14th Meeting, Geneva, CH, Mar. 19-27, 2019, document JVET-N0217, 2019.
Zhang et al. "CE4-Related: Interweaved Prediction for Affine Motion Compensation," Joint Video Experts Team JVET) of ITU-T SG 16 WP 3 and ISO/IEC JTC 1/SC 29/1/VG 11, 11th Meeting, Ljubljana, SI, Jul. 10-18, 2018. document JVET-K0102, 2018.
Chen et al. "Algorithm description for Versatile Video Coding and Test Model 5 (VTM 5)," Joint Video Experts Team JVET) of ITU-T SG 16 WP 3 and ISO/IEC JTC 1/SC 29/WG 1114th Meeting: Geneva, CH, Mar. 19-27, 2019, document JVET-N1002, 2019.
Fan et al. "Non-CE6: A Unified Zero-Out Range for 4x4 LFNST," Joint Video Experts Team (JVET) of ITU-T SG 16 WP 3 and ISO/IEC JTC 1/SC 29/WG 11 16th Meeting, Geneva, CH Oct. 1-11, 2019, document JVET-P0379, 2019.
Non Final Office Action from U.S. Appl. No. 17/406,260 dated Dec. 29, 2021.
Internnational Search Report and Written Opinion from International Patent Application No. PCT/CN2020/086421 dated Jul. 22, 2020 (11 pages).
Internnational Search Report and Written Opinion from International Patent Application No. PCT/CN2020/086444 dated Aug. 11, 2020 (11 pages).
International Search Report and Written Opinion from International Patent Application No. PCT/CN2020/086458 dated Jul. 6, 2020 (9 pages).
International Search Report and Written Opinion from International Patent Application No. PCT/CN2020/096046 dated Sep. 24, 2020 (11 pages).
International Search Report and Written Opinion from International Patent Application No. PCT/CN2020/133273 dated Feb. 18, 2021 (10 pages).
International Search Report and Written Opinion from International Patent Application No. PCT/CN2020/082962 dated Jul. 1, 2021 (10 pages).
Non Final Office Action from U.S. Appl. No. 17/406,242 dated Dec. 13, 2021.
Non Final Office Action from U.S. Appl. No. 17/406,242 dated Aug. 4, 2022.
Document: JVET-N0555-v3, Siekmann, M., et al., "CE6-related: Simplification of the Reduced Secondary Transform," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.
JVET-N0555-v1, Siekmann, M., et al., "CE6—related: Simplification of the Reduced Secondary Transform," Fraunhofer HHI, Mar. 24, 2019, 10 pages.
Document: JVET-E0380, Alshina, E., et al., "CE7: Experimental results of ROT by Samsung," Joint Collaborative Team on Video Coding (JCT-VC) of ITU-T SG16 WP3 and ISO/IEC JTC1/SC29/WG11 5th Meeting: Geneva, CH, Mar. 16-23, 2011, 10 pages.
Document: JCTVC-I0408, Lan, C., et al., "Intra transform skipping," Joint Collaborative Team on Video Coding (JCT-VC) of ITU-T SG 16 WP 3 and ISO/IEC JTC 1/SC 29/WG 11 9th Meeting: Geneva, CH, 27 Apr.-May 7, 2012, 6 pages.
Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 18 pages.
Document: JVET-M0292, Koo., M., et al., "CE6: Reduced Secondary Transform (RST) (test 6.5.1)," Joint Video Experts Team (JVET) of ITU-T SG 16 WP 3 and ISO/IEC JTC 1/SC 29/WG 11, 13th Meeting: Marrakech, MA, Jan. 9-18, 2019, 16 pages.
Columbia TriStar Home Video DVD, optical disc storing video bitstream of motion picture "Anatomy of a Murder," Year 2000, 3 pages.
Non-Final Office Action from U.S. Appl. No. 17/953,045 dated Mar. 29, 2024, 26 pages.

* cited by examiner

FIG. 9

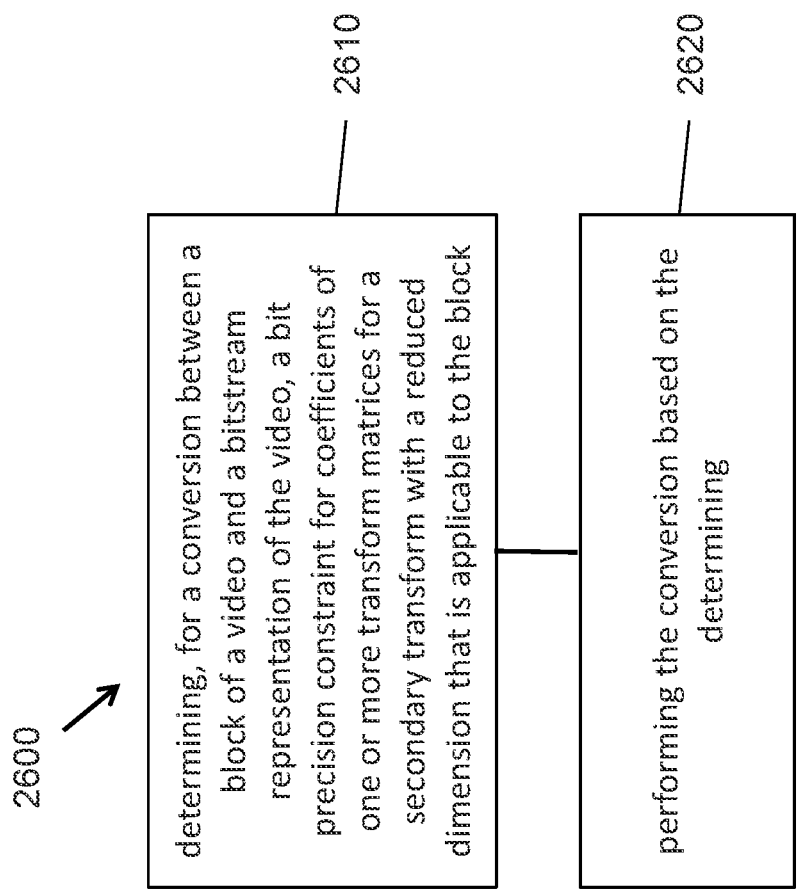

USE OF SECONDARY TRANSFORM IN CODED VIDEO

CROSS REFERENCE TO RELATED APPLICATIONS

This application is a continuation application of U.S. application Ser. No. 17/406,242, filed on Aug. 19, 2021, which is a continuation of International Patent Application No. PCT/CN2020/086444, filed on Apr. 23, 2020, which claims the priority to and benefits of International Patent Application No. PCT/CN2019/083853, filed on Apr. 23, 2019. All the aforementioned patent applications are hereby incorporated by reference in their entireties.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present disclosure describes various embodiments and techniques in which a secondary transform (also referred to as Low Frequency Non-Separable Transform) is used during decoding or encoding of video or images.

In one example aspect, a method of video processing is disclosed. The method includes determining, for a conversion between a block of a video and a bitstream representation of the video, that an output value from an inverse secondary transform with a reduced dimension is constrained within a range of [min, max] inclusively. The inverse secondary transform is applicable to the block between a de-quantization step and an inverse primary transform. The reduced dimension is reduced from a dimension of the block, and min and max are integer values. The method also includes performing the conversion based on the determining.

In another example aspect, a method of video processing is disclosed. The method includes determining, for a conversion between a block of a video and a bitstream representation of the video, a manner of applying a secondary transform with a reduced dimension to a sub-block of the block based on a number of sub-blocks that the secondary transform is applicable to. The secondary transform is applicable to the block between a forward primary transform and a quantization step or between a de-quantization step and an inverse primary transform. The reduced dimension is reduced from a dimension of the block. The method also includes performing the conversion based on the determining.

In another example aspect, a method of video processing is disclosed. The method includes determining, for a conversion between a block of a video and a bitstream representation of the video, that a secondary transform with a reduced dimension is applicable to a single sub-block of the block in case a dimension of the block satisfies a condition. The secondary transform is performed between a forward primary transform and a quantization step or between a de-quantization step and an inverse primary transform. The reduced dimension is reduced from a dimension of the block. The method also includes performing the conversion based on the determining.

In another example aspect, a method of video processing is disclosed. The method includes determining, for a conversion between a block of a video and a bitstream representation of the video, that a secondary transform with a reduced dimension is applicable to a region in the block that has a dimension of K×L. K and L are positive integers and K is not equal to L. The secondary transform is performed between a forward primary transform and a quantization step or between a de-quantization step and an inverse primary transform. The reduced dimension is reduced from a dimension of the block. The method also includes performing the conversion based on the determining.

In another example aspect, a method of video processing is disclosed. The method includes determining, for a conversion between a block of a video and a bitstream representation of the video, a non-zero range based on a characteristic of the block. The non-zero range corresponds to a range outside which coefficients associated with a secondary transform with a reduced dimension are set to zero. The secondary transform is performed between a forward primary transform and a quantization step or between a de-quantization step and an inverse primary transform. The reduced dimension is reduced from a dimension of the block. The method also includes performing the conversion based on the determining.

In another example aspect, a method of video encoding is disclosed. The method includes determining that a secondary transform with a reduced dimension is applicable to two adjacent sub-blocks of a block of a video. Each of the two adjacent sub-blocks has a dimension of M×N, M and N being positive integers. The secondary transform is performed between a forward primary transform and a quantization step. The reduced dimension is reduced from a dimension of the block. The method also includes generating a coded representation of the video based on the determining.

In another example aspect, a method of video decoding is disclosed. The method includes determining that a secondary transform with a reduced dimension is applicable to two adjacent sub-blocks of a block of a video. Each of the two adjacent sub-blocks has a dimension of M×N, M and N being positive integers. The secondary transform is performed between a de-quantization step and an inverse primary transform. The reduced dimension is reduced from a dimension of the block. The method also includes generating the block of the video by parsing a coded representation of the video according to the determining.

In another example aspect, a method of video processing is disclosed. The method includes determining, for a conversion between a block of a video and a bitstream representation of the video, whether to apply a secondary transform with a reduced dimension to the block based on a characteristic associated with the block according to a rule. The secondary transform is performed between a forward primary transform and a quantization step or between a de-quantization step and an inverse primary transform. The reduced dimension is reduced from a dimension of the block. The method also includes performing the conversion based on the determining.

In another example aspect, a method of video processing is disclosed. The method includes determining, for a conversion between a block of a video and a bitstream representation of the video, a bit precision constraint for coefficients of one or more transform matrices for a secondary transform with a reduced dimension that is applicable to the block. The secondary transform is performed between a forward primary transform and a quantization step or between a de-quantization step and an inverse primary transform. The reduced dimension is reduced from a dimension of the block. The method also includes performing the conversion based on the determining.

In another example aspect, a method of video processing is disclosed. The method includes determining a constraint rule for selectively applying a secondary transform with reduced dimensions during to a conversion between a bitstream representation of a current video block and pixels of the current video block and performing the conversion by applying the secondary transform with reduced dimensions according to the constraint rule. The secondary transform with reduced dimensions has dimensions reduced from a dimension of the current video block. The secondary transform with reduced dimensions is applied in a specific order together with a primary transform during the conversion.

In another example aspect, another method of video processing is disclosed. The method includes determining a constraint rule for selectively applying a secondary transform with reduced dimensions during to a conversion between a bitstream representation of a current video block and a neighboring video region and pixels of the current video block and pixels of the neighboring region, and performing the conversion by applying the secondary transform with reduced dimensions according to the constraint rule. The secondary transform with reduced dimensions has dimensions reduced from a dimension of the current video block and the neighboring video region. The secondary transform with reduced dimensions is applied in a specific order together with a primary transform during the conversion.

In yet another example aspect, another method of video processing is disclosed. The method includes determining a zeroing-out rule for selectively applying a secondary transform with reduced dimensions during to a conversion between a bitstream representation of a current video block and pixels of the current video block and performing the conversion by applying the secondary transform with reduced dimensions according to the zeroing-out rule. The secondary transform with reduced dimensions has dimensions reduced from a dimension of the current video block. The zeroing-out rule specifies a maximum number of coefficients used by the secondary transform with reduced dimensions.

In yet another example aspect, another method of video processing is disclosed. The method includes determining a zeroing-out rule for selectively applying a secondary transform with reduced dimensions during to a conversion between a bitstream representation of a current video block and pixels of the current video block and performing the conversion by applying the secondary transform with reduced dimensions according to the zeroing-out rule. The secondary transform with reduced dimensions has dimensions reduced from a dimension of the current video block. The zeroing-out rule specifies a maximum number of coefficients used by the secondary transform with reduced dimensions.

In yet another example aspect, another method of video processing is disclosed. The method includes determining a condition for selectively applying a secondary transform with reduced dimensions during a conversion between a bitstream representation of a current video block and pixels of the current video block and performing the conversion by applying the secondary transform with reduced dimensions according to the condition. The secondary transform with reduced dimensions has dimensions reduced from a dimension of the current video block. The condition is signaled in the bitstream representation.

In yet another example aspect, another method of video processing is disclosed. The method includes selectively applying a secondary transform with reduced dimensions during to a conversion between a bitstream representation of a current video block and pixels of the current video block and performing the conversion by applying the secondary transform with reduced dimensions according to the condition. The secondary transform with reduced dimensions has dimensions reduced from a dimension of the current video block. The conversion includes selectively applying a Position Dependent intra Prediction Combination (PDPC) based on a coexistence rule.

In yet another example aspect, another method of video processing is disclosed. The method includes applying a secondary transform with reduced dimensions during to a conversion between a bitstream representation of a current video block and pixels of the current video block, and performing the conversion by applying the secondary transform with reduced dimensions according to the condition. The secondary transform with reduced dimensions has dimensions reduced from a dimension of the current video block. The applying controls a use of neighboring samples for intra prediction during the conversion.

In yet another example aspect, another method of video processing is disclosed. The method includes selectively applying a secondary transform with reduced dimensions during to a conversion between a bitstream representation of a current video block and pixels of the current video block, and performing the conversion by applying the secondary transform with reduced dimensions according to the condition. The secondary transform with reduced dimensions has dimensions reduced from a dimension of the current video block. The selectively applying controls a use of quantization matrix during the conversion.

In yet another example aspect, a video encoder is disclosed. The video encoder comprises a processor configured to implement one or more of the above-described methods.

In yet another example aspect, a video decoder is disclosed. The video decoder comprises a processor configured to implement one or more of the above-described methods.

In yet another example aspect, a computer readable medium is disclosed. The medium includes code for implementing one or more of the above-described methods stored on the medium.

These, and other, aspects are described in the present disclosure.

BRIEF DESCRIPTION OF DRAWINGS

FIG. 9 shows an example order of processing of the rows of pixels to maximize throughput for 4×N blocks with vertical predictor

FIG. 26 is a flowchart of yet another example method of video processing in accordance with the present technology.

DETAILED DESCRIPTION

Figure 1:
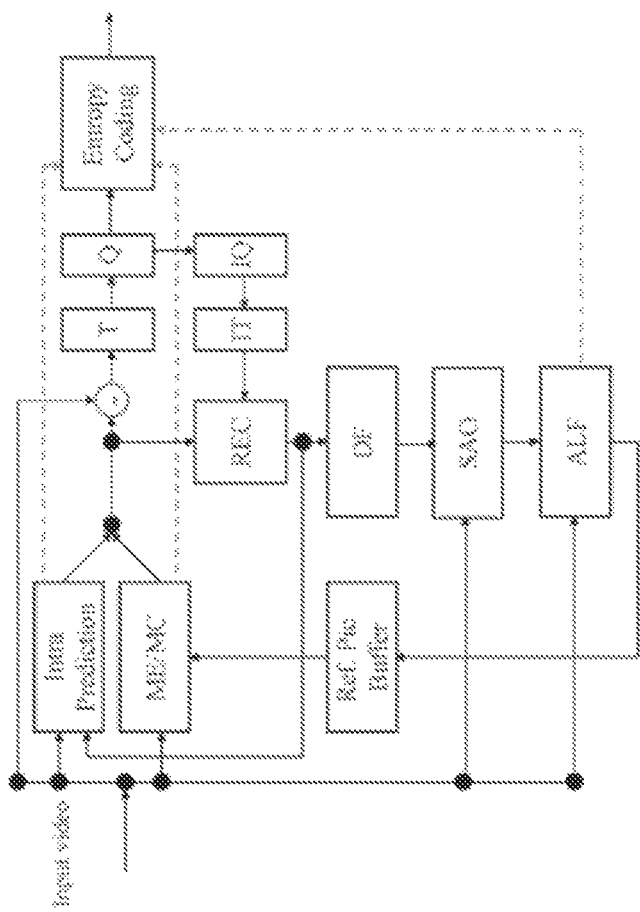
FIG. 1 shows an example of an encoder block diagram.

Section headings are used in the present disclosure to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Overview

The present disclosure is related to video coding technologies. Specifically, it is related transform in video coding. It may be applied to the existing video coding standard like High Efficiency Video Coding (HEVC), or the standard Versatile Video Coding (VVC) to be finalized. It may be also applicable to future video coding standards or video codec.

2. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM) [2]. In April 2018, the Joint Video Expert Team (JVET) between VCEG (Q6/16) and ISO/IEC Joint Technical Committee (JTC 1) SC29/WG11 (MPEG) was created to work on the VVC standard targeting at 50% bitrate reduction compared to HEVC.

2.1 Color Space and Chroma Subsampling

Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 Format 4:4:4

Each of the three Y'CbCr components have the same sample rate, thus there is no chroma subsampling. This scheme is sometimes used in high-end film scanners and cinematic post production.

2.1.2 Format 4:2:2

The two chroma components are sampled at half the sample rate of luma: the horizontal chroma resolution is halved. This reduces the bandwidth of an uncompressed video signal by one-third with little to no visual difference 2.1.3 Format 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In Joint Photographic Experts Group (JPEG)/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra mode coding with 67 intra prediction modes

To capture the arbitrary edge directions presented in natural video, the number of directional intra modes is extended from 33, as used in HEVC, to 65. The additional directional modes are depicted as dotted arrows in FIG. 2, and the planar and DC modes remain the same. These denser directional intra prediction modes apply for all block sizes and for both luma and chroma intra predictions.

Figure 2:
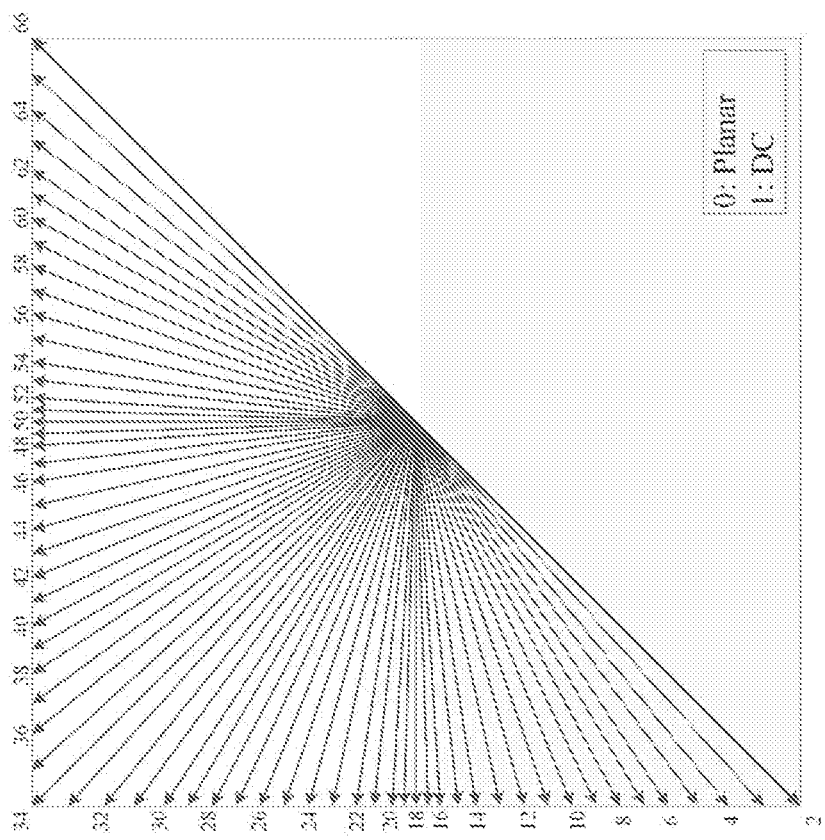
FIG. 2 shows an example of 67 intra prediction modes.

Conventional angular intra prediction directions are defined from 45 degrees to-135 degrees in clockwise direction as shown in FIG. 2. In VVC test model (VTM)2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its side is a power of 2. Thus, no division operations are required to generate an intra-predictor using DC mode. In VTM2, blocks can have a rectangular shape that necessitates the use of a division operation per block in the general case. To avoid division operations for direct current (DC) prediction, only the longer side is used to compute the average for non-square blocks.

2.4 Wide-Angle Intra Prediction for Non-Square Blocks

Conventional angular intra prediction directions are defined from 45 degrees to-135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 3A:
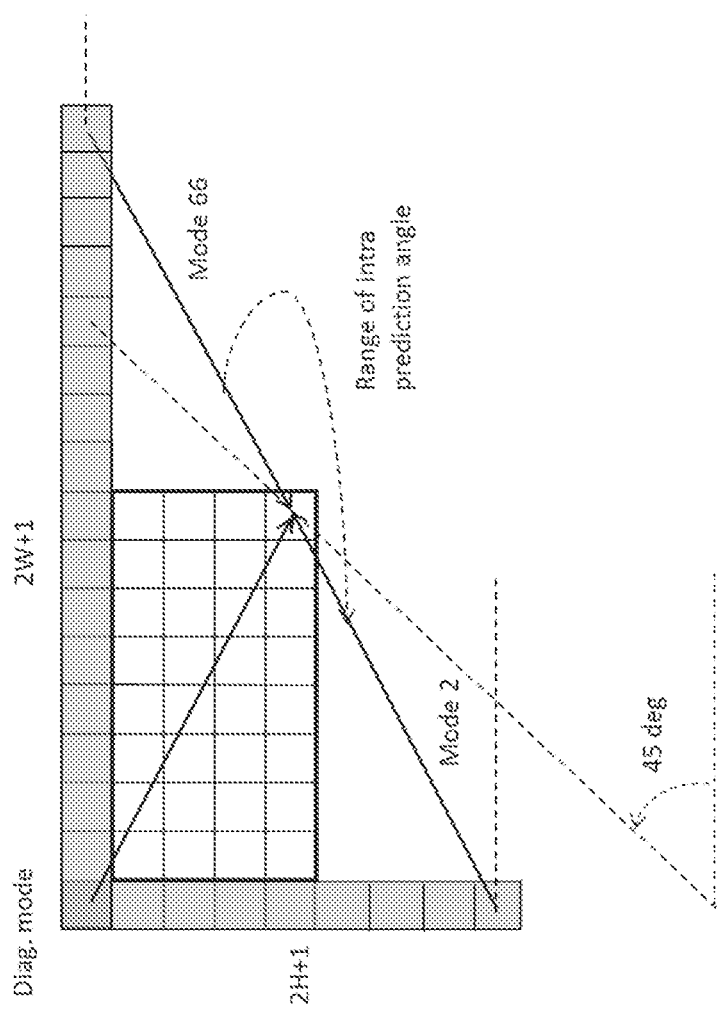
FIG. 3A-3B show examples of reference samples for wide-angular intra prediction.
Figure 3B:
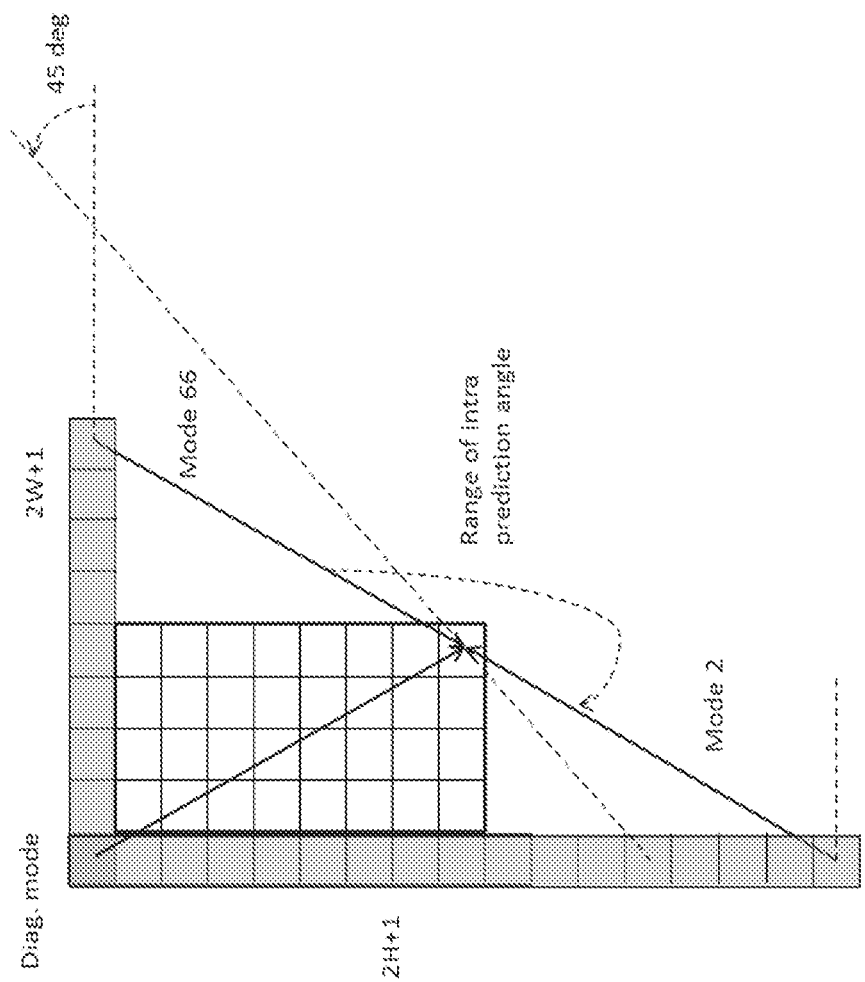

To support these prediction directions, the top reference with length 2W+1, and the left reference with length 2H+1, are defined as shown in FIG. 3A-3B.

The mode number of replaced mode in wide-angular direction mode is dependent on the aspect ratio of a block. The replaced intra prediction modes are illustrated in Table 1.

TABLE 1

Intra prediction modes replaced by wide-angular modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == ½ | Modes 61, 62, 63, 64, 65, 66 |
| H/W < ½ | Mode 57, 58, 59, 60, 61, 62, 63, 64, 65, 66 |

Figure 4:
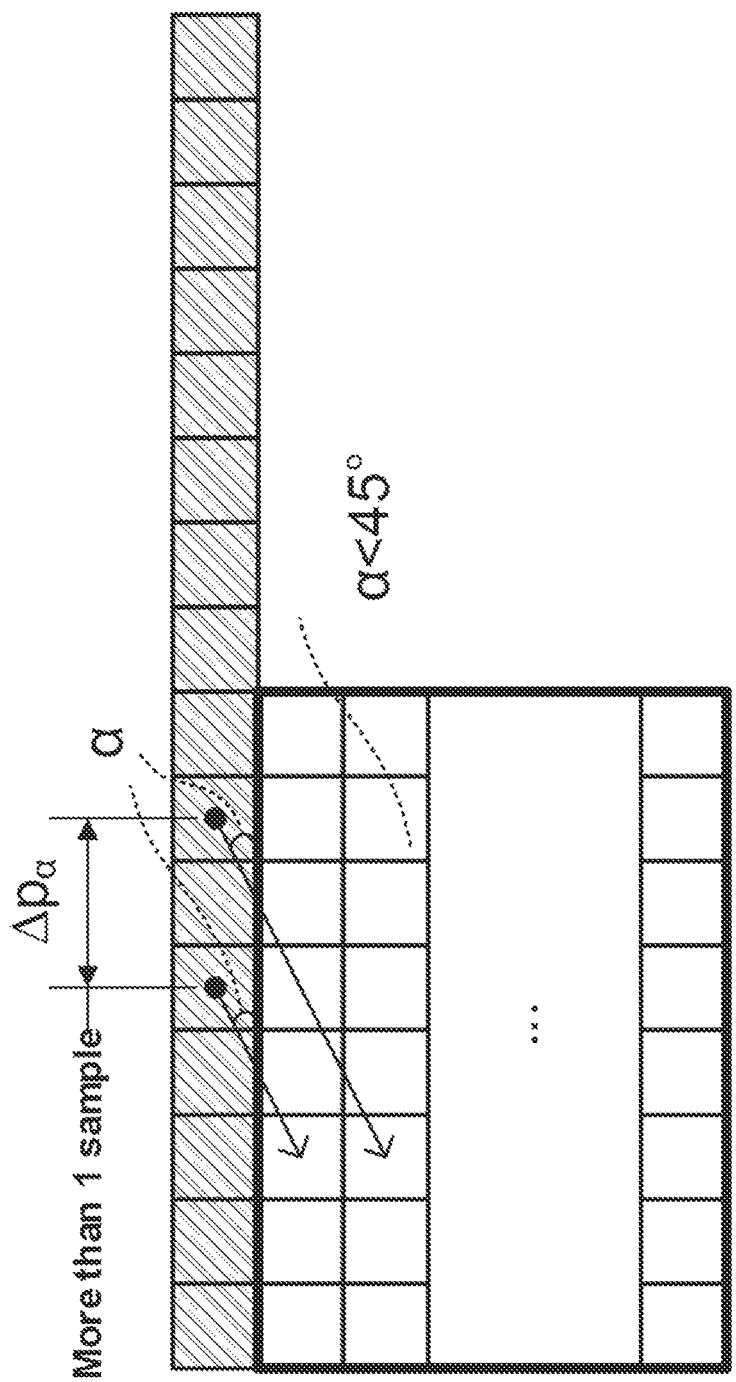
FIG. 4 is an example illustration of a problem of discontinuity in case of directions beyond 45 degrees.
Figure 5A:
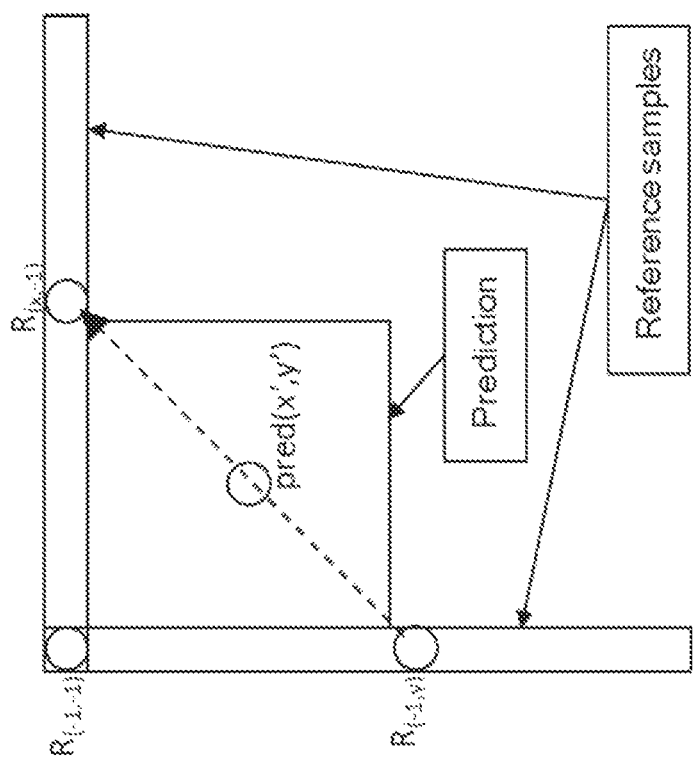
FIG. 5A-5D show an example illustration of samples used by PDPC applied to diagonal and adjacent angular intra modes.
Figure 5B:
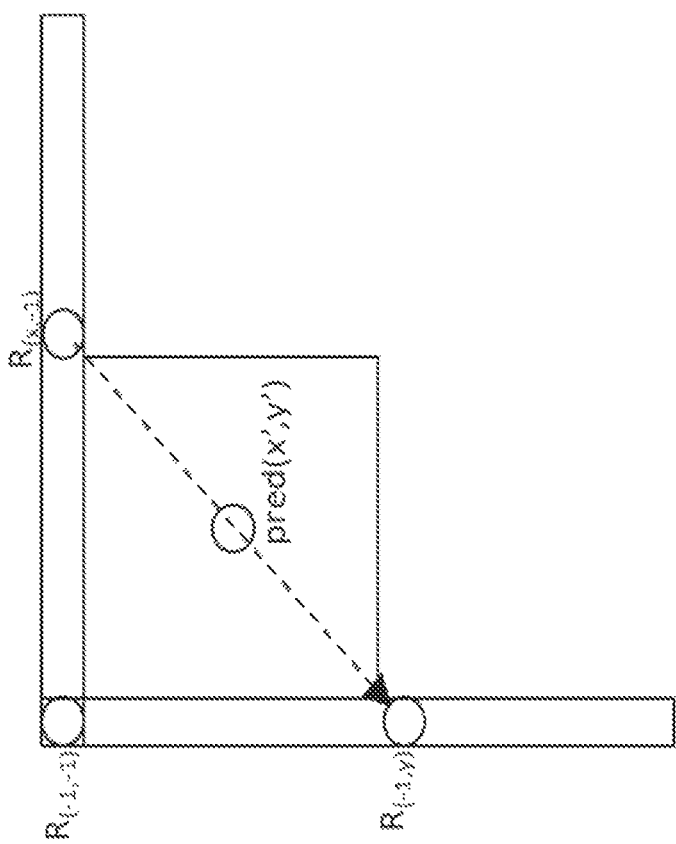
Figure 5C:
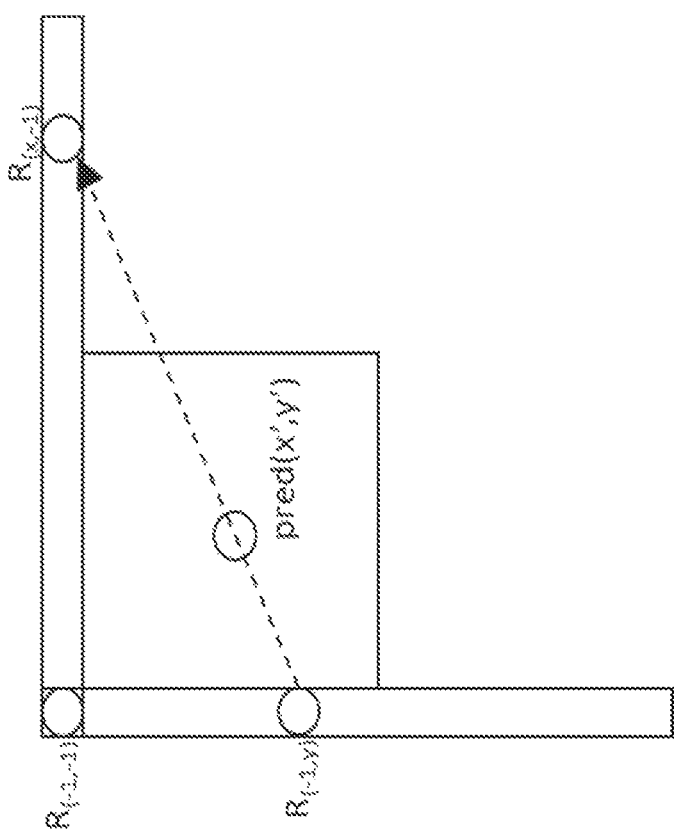
Figure 5D:
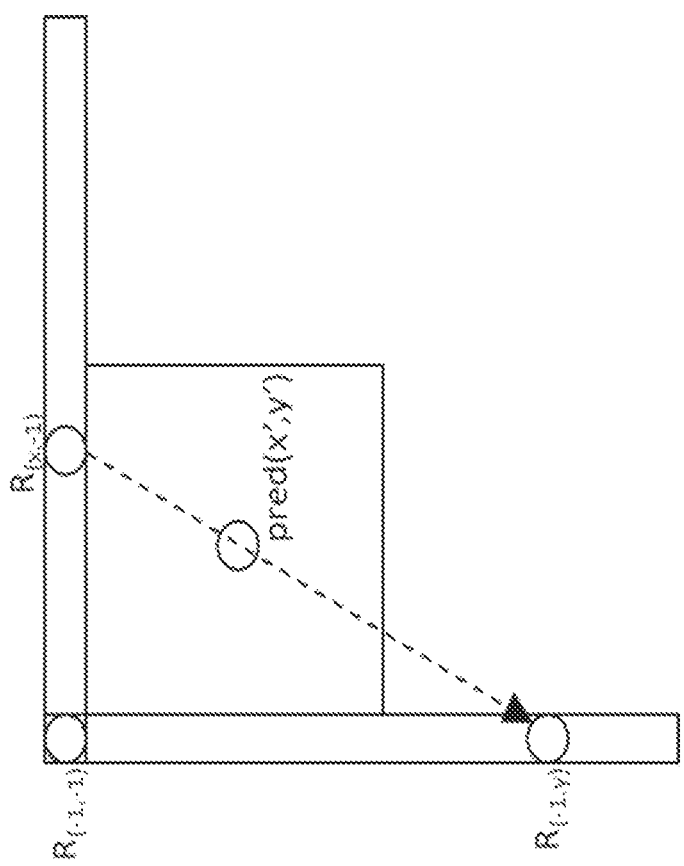

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without Signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIG. 5A-5D illustrates the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

FIGS. 5A to 5D provide definition of samples used by PDPC applied to diagonal and adjacent angular intra modes.

The PDPC weights are dependent on prediction modes and are shown in Table 2.

TABLE 2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |

TABLE 2-continued

Example of PDPC weights according to prediction modes

| Prediction modes | wT | wL | wTL |
|---|---|---|---|
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.6 Intra Subblock Partitioning (ISP)

Figure 6:
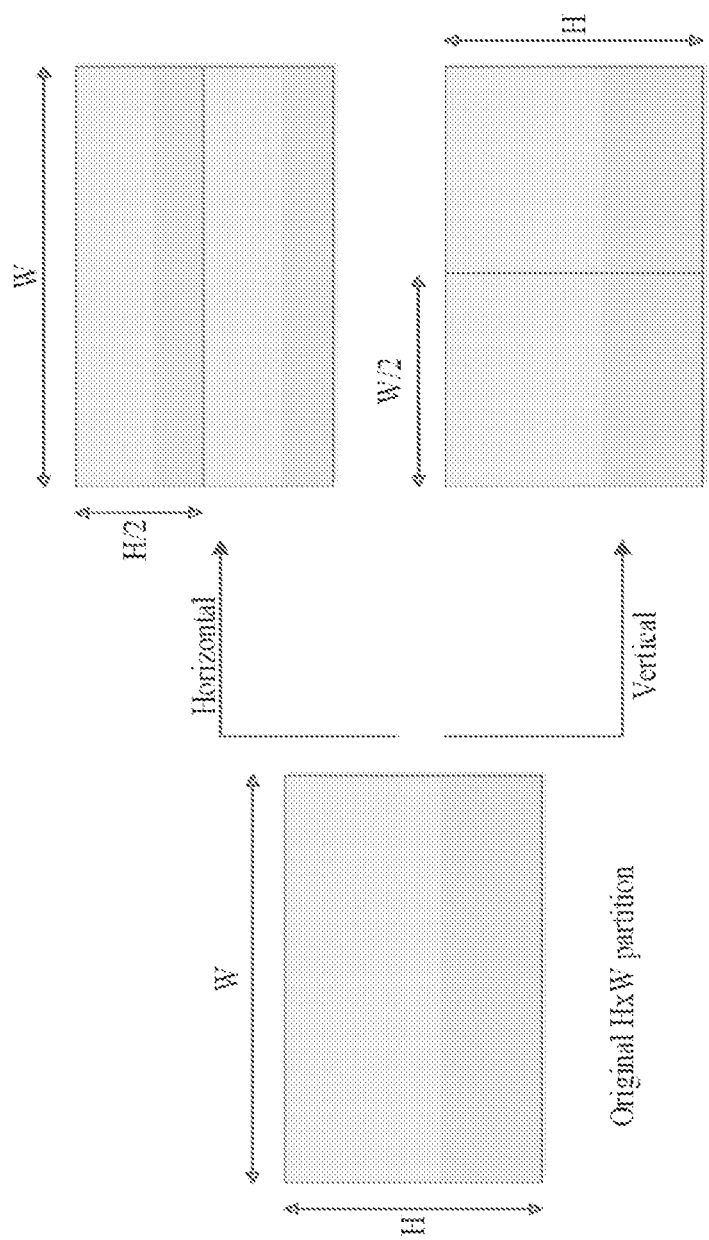
FIG. 6 is an example of division of 4×8 and 8×4 blocks.
Figure 7:
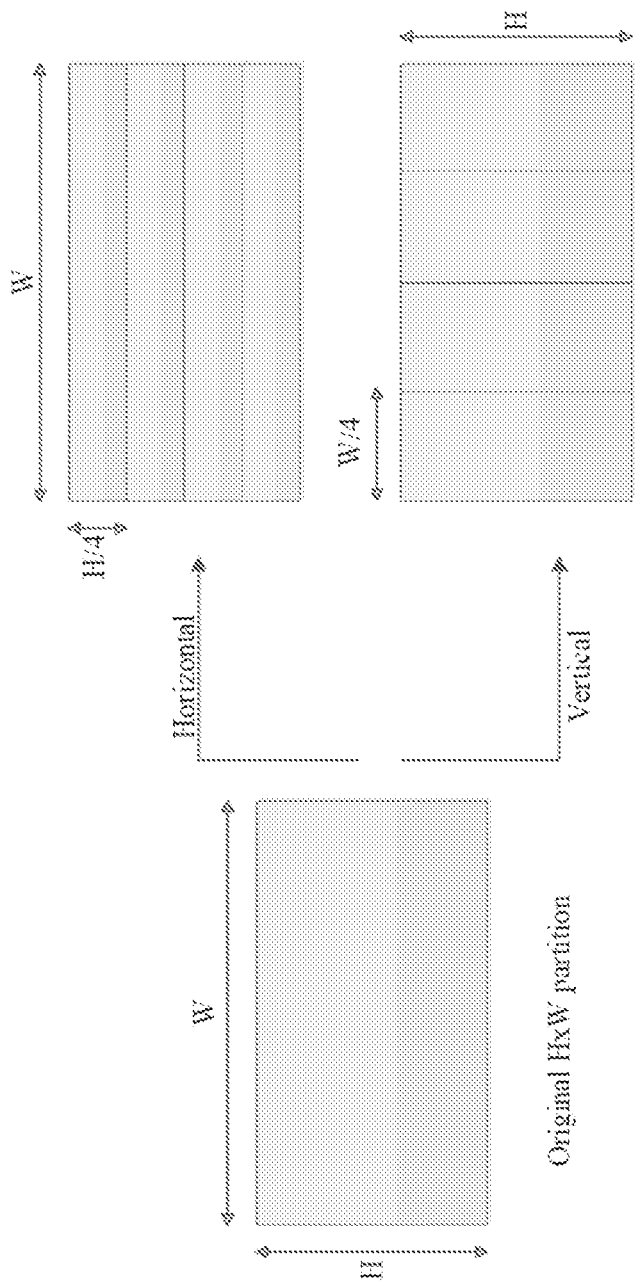
FIG. 7 is an example of division of all blocks except 4×8, 8×4 and 4×4.

In some embodiments, ISP is proposed to divide luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

FIG. 6 shows an example of division of 4×8 and 8×4 blocks.

FIG. 7 shows an example of division of all blocks except 4×8, 8×4 and 4×4.

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the coding unit (CU) and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Block Differential Pulse-Code Modulation Coding (BDPCM)

Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4×8 block predicted vertically.

Figure 8:
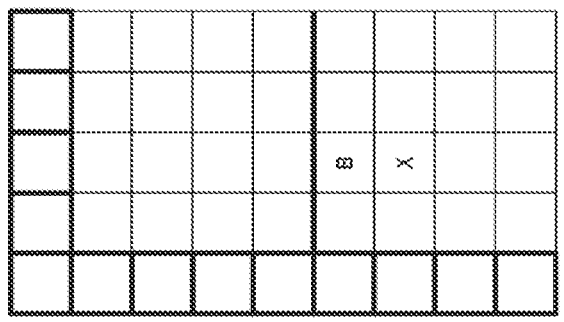
FIG. 8 dividing a block of 4×8 samples into two independently decodable areas.
Figure 8:
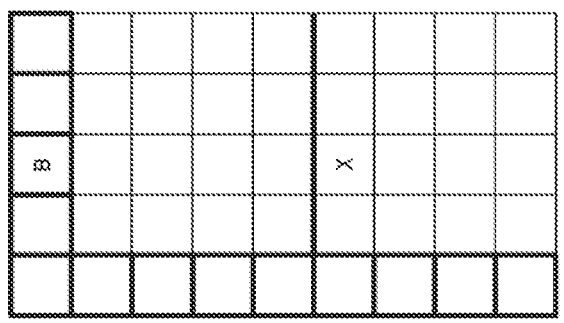
Figure 8:
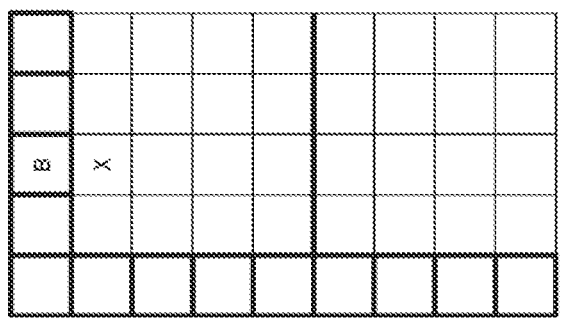

FIG. 8 shows an example of dividing a block of 4×8 samples into two independently decodable areas.

Figure 9:
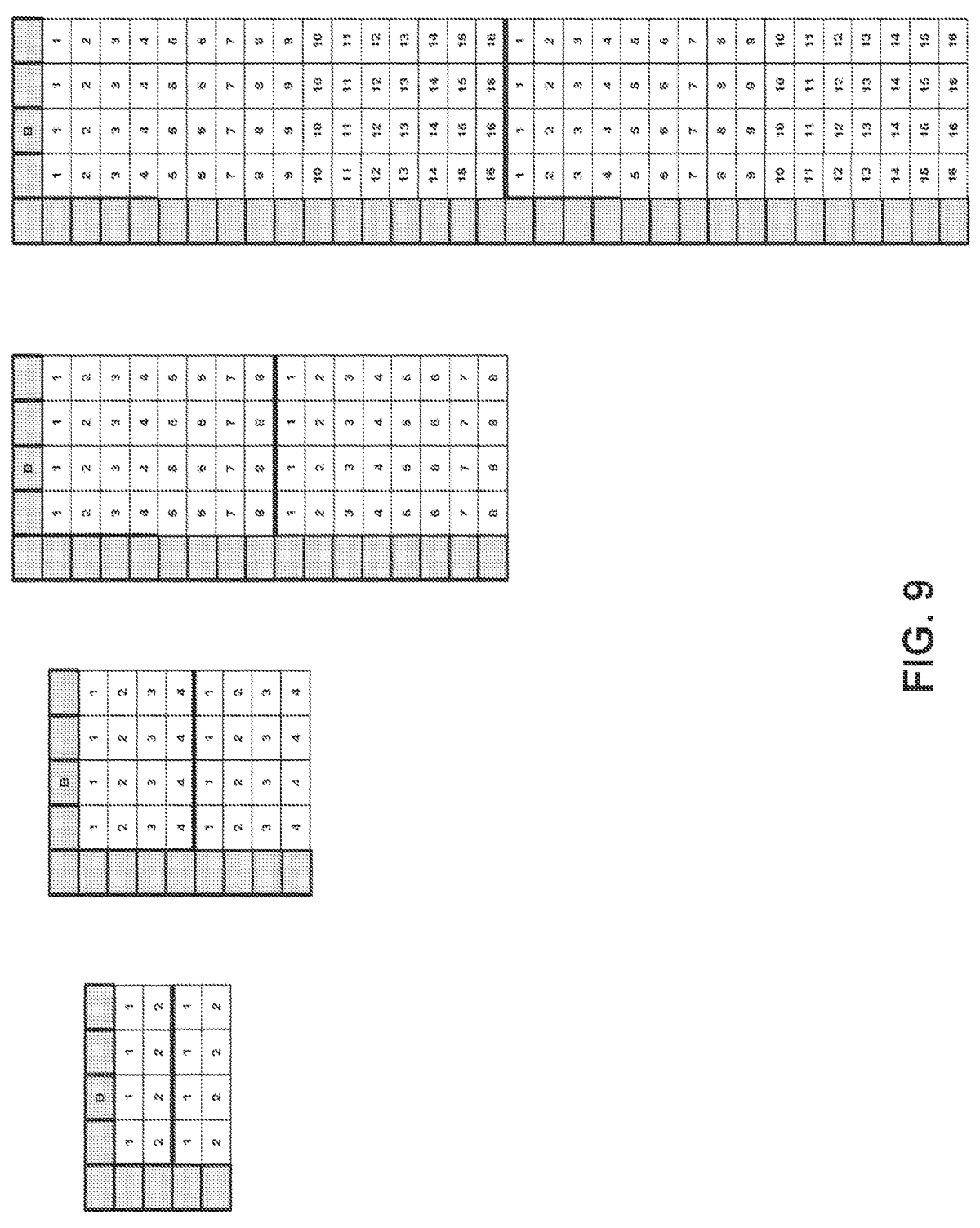

Thanks to this property, it becomes now possible to process a 4×4 block in 2 cycles, and a 4×8 or 8×4 block in 4 cycles, and so on, as shown on FIG. 9.

FIG. 9 shows an example of order of processing of the rows of pixels to maximize throughput for 4×N blocks with vertical predictor.

Table 4 summarizes the number of cycles required to process the block, depending on the block size. It is trivial to show that any block which has both dimensions larger or equal to 8 can be processed in 8 pixels per cycle or more.

TABLE 4

Worst case throughput for blocks of size 4 × N, N × 4

| Block size | 4 × 4 | 4 × 8, 8 × 4 | 4 × 16, 16 × 4 | 4 × 32, 32 × 4 |
|---|---|---|---|---|
| Cycles | 2 | 4 | 8 | 16 |
| Pixels | 16 | 32 | 64 | 128 |
| Throughput (pixels/cycle) | 8 | 8 | 8 | 8 |

2.8 Quantized Residual Domain BDPCM

In some embodiments, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \le i \le M-1$, $0 \le j \le N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by:

$$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \sum_{k=0}^{j} \tilde{r}_{k,j}, \ 0 \le i \le (M-1), \ 0 \le j \le (N-1).$$

For horizontal case, $$Q(r_{i,j}) = \sum_{k=0}^{j} \tilde{r}_{i,j}, \ 0 \le i \le (M-1), \ 0 \le j \le (N-1).$$

The inverse quantized residuals, $Q^{-1}$ ($Q(r_{i,j})$), are added to the intra block prediction values to produce the reconstructed sample values.

The main benefit of this scheme is that the invert DPCM can be done on the fly during coefficient parsing simply adding the predictor as the coefficients are parsed or it can be performed after parsing.

Transform skip is always used in quantized residual domain BDPCM.

2.9 Multiple Transform Set (MTS) in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/discrete sine transform (DST)7. The newly introduced transform matrices are DST-VII and DCT-VIII. The table below shows the basis functions of the selected DST/DCT.

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \ne 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signaled to indicate whether MTS is applied or not. Here, MTS is applied only for luma. The MTS CU level flag is signaled when the following conditions are satisfied.

Both width and height smaller than or equal to 32
Coded block flag (CBF) is equal to one If MTS CU flag is equal to zero, then DCT2 is applied in both directions. However, if MTS CU flag is equal to one, then two other flags are additionally signaled to indicate the transform type for the horizontal and vertical directions, respectively. Transform and Signaling mapping table as shown in Table 3-10. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signaled when the CU level MTS_CU_flag is not equal to zero. The block size limitation for transform skip is the same to that for MTS in Joint Exploration Test Model (JEM)4, which indicate that transform skip is applicable for a CU when both block width and height are equal to or less than 32.

2.10 Example Reduced Secondary Transform (RST)

2.10.1 Example Non-Separable Secondary Transform (NSST)

Figure 10:
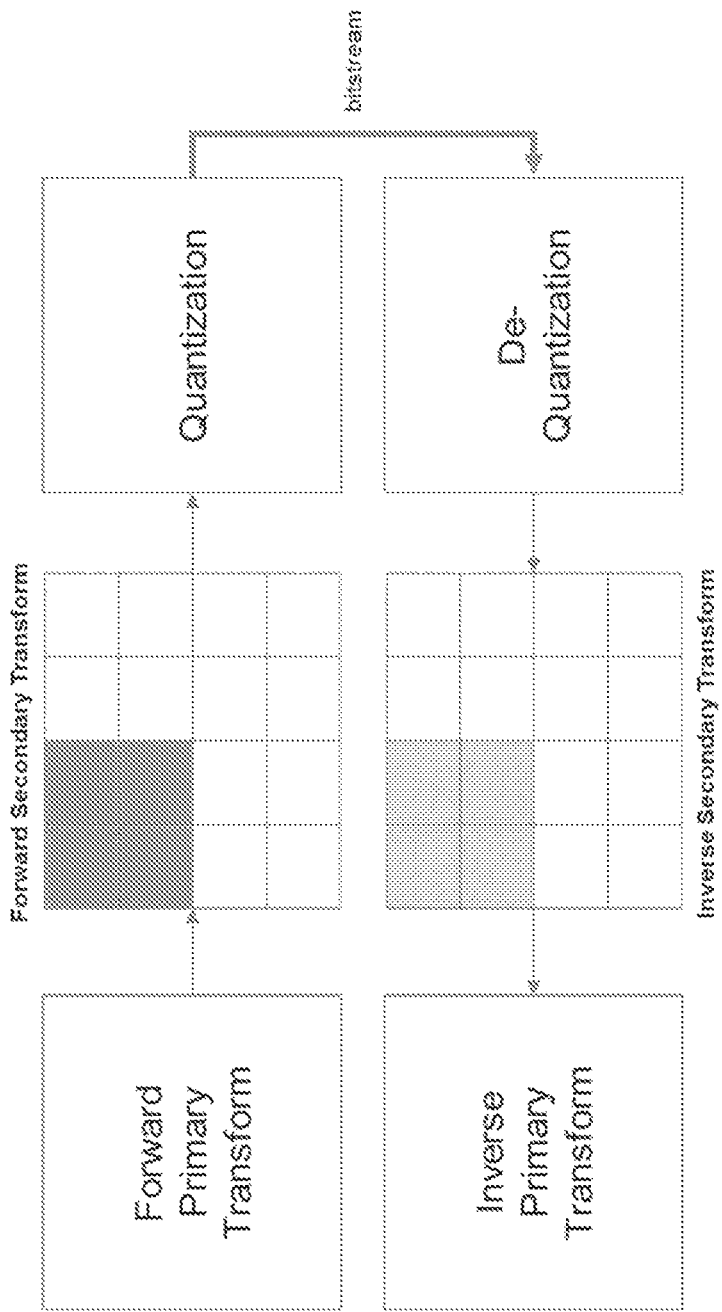
FIG. 10 shows an example of secondary transform.

In some embodiments, secondary transform, also referred to non-separable transform, is applied between forward primary transform and quantization (at encoder) and between de-quantization and invert primary transform (at decoder side). As shown in FIG. 10, a 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

FIG. 10 shows an example of secondary transform in JEM.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

The non-separable transform is calculated as $\vec{F}=T\cdot\vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signaled secondary transform index. The index is signaled in a bit-stream once per Intra CU after transform coefficients.

2.10.2 Example Reduced Secondary Transform (RST)/Low Frequency Non-Separable Transform (LFNST)

Figure 11:
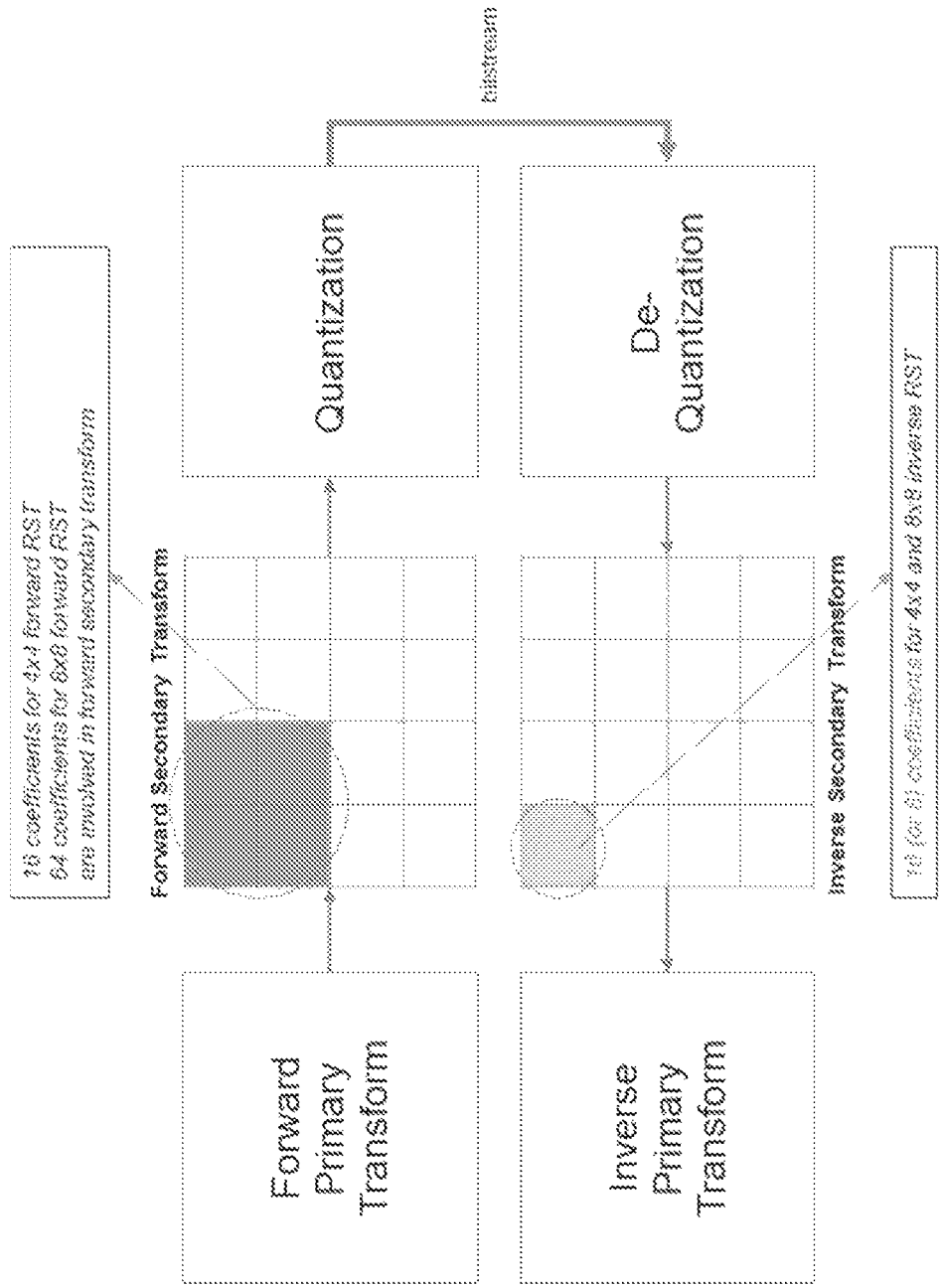
FIG. 11 shows an example of the proposed Reduced Secondary Transform (RST).

The Reduced Secondary Transform (RST), also referred to as Low Frequency Non-Separable Transform (LFNST), was introduced as 4 transform set (instead of 35 transform sets) mapping. In some embodiments, 16×64 (may further be reduced to 16×48) and 16×16 matrices are employed for 8×8 and 4×4 blocks, respectively. For notational convenience, the 16×64 (may further be reduced to 16×48) transform is denoted as RST8×8 and the 16×16 one as RST4×4. FIG. 11 shows an example of RST.

FIG. 11 shows an example of the proposed Reduced Secondary Transform (RST).

RST Computation

The main idea of a Reduced Transform (RT) is to map an N dimensional vector to an R dimensional vector in a different space, where R/N (R<N) is the reduction factor.

The RT matrix is an R×N matrix as follows:

$$T_{R\times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. Examples of the forward and inverse RT are depicted in FIG. 12.

Figure 12:
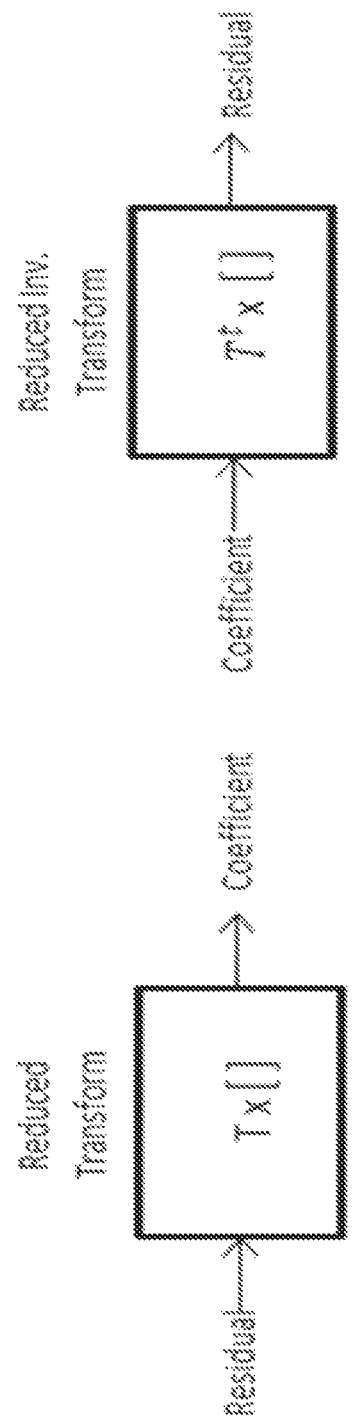
FIG. 12 show an example of a forward and invert (or inverse) Reduced Transform.

FIG. 12 show an example of a forward and invert Reduced Transform.

In some embodiments, the RST8×8 with a reduction factor of 4 (¼ size) is applied. Hence, instead of 64×64, which is conventional 8×8 non-separable transform matrix size, a 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:
 a. Block size is greater than or equal to the given threshold (W>=4 && H>=4)
 b. Transform skip mode flag is equal to zero If both width (W) and height (H) of a transform coefficient block is greater than 4, then the RST8×8 is applied to the top-left 8×8 region of the transform coefficient block. Otherwise, the RST4×4 is applied on the top-left min (8, W)×min (8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

In some embodiments, Intra Sub-Partitions (ISP), as a new intra prediction mode, was adopted. When ISP mode is selected, RST is disabled and RST index is not signaled, because performance improvement was marginal even if RST is applied to every feasible partition block. Furthermore, disabling RST for ISP-predicted residual could reduce encoding complexity.

RST Selection

An RST matrix is chosen from four transform sets, each of which consists of two transforms. Which transform set is applied is determined from intra prediction mode as the following:
 (1) If one of three cross-component linear model (CCLM) modes is indicated, transform set 0 is selected.
 (2) Otherwise, transform set selection is performed according to the following table:

The Transform Set Selection Table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

RST Matrices of Reduced Dimension

Figure 13:
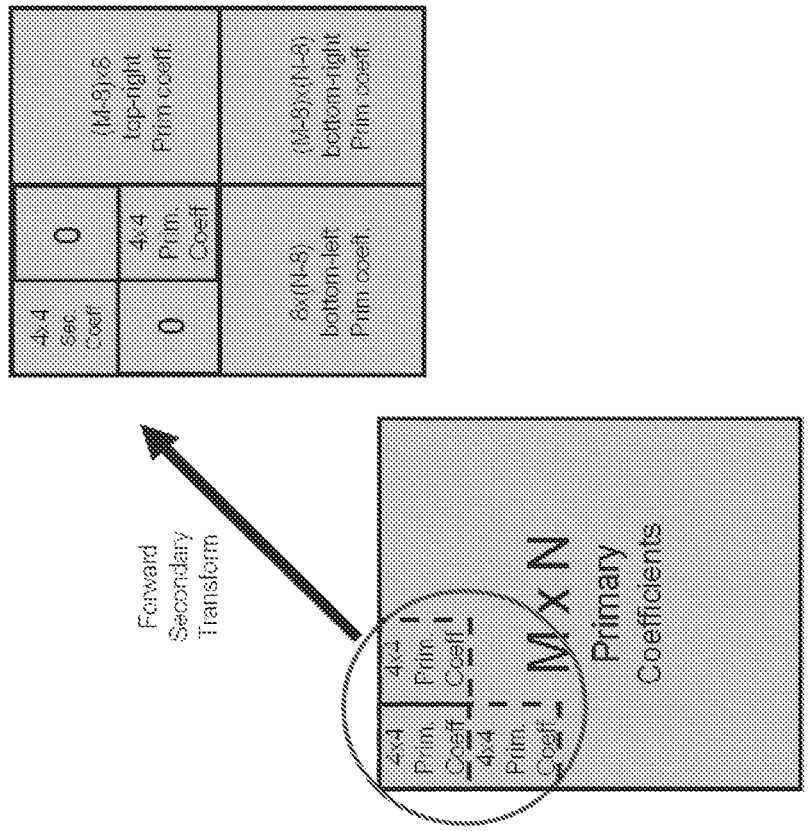
FIG. 13 shows an example of forward RST8×8 process with 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (FIG. 13).

FIG. 13 shows an example of forward RST8×8 process with 16×48 matrix.

RST Signaling

Figure 14:
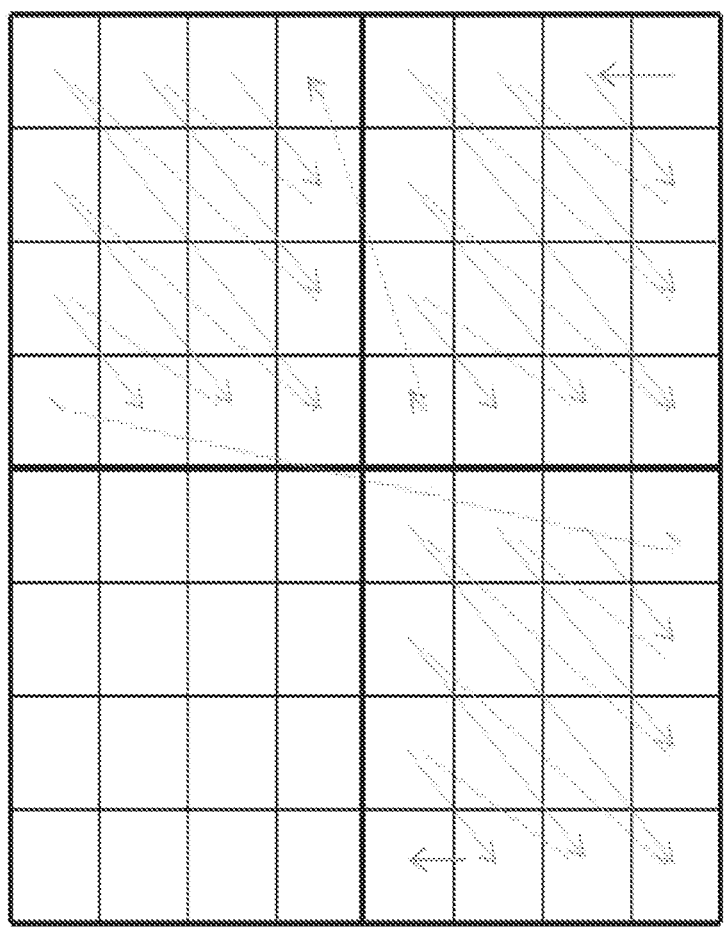
FIG. 14 shows an example of scanning the position 17 to 64 for non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

FIG. 14 shows an example of scanning the position 17 to 64 for non-zero element.

Zero-Out Range

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a one dimensional (1-D) array before the invert RST must be zero.

When nonZeroSize is equal to 16, there is no zero-out constrain on the coefficients in the top-left 4×4 sub-block.

In some embodiments, when the current block size is 4×4 or 8×8, nonZeroSize is set equal to 8. For other block dimensions, nonZeroSize is set equal to 16.

Example Description of RST

In the tables and description below, bold-faced italicized text is used to denote changes that can be made to current syntax to accommodate certain embodiments described in the present disclosure.

| Sequence parameter set RBSP syntax | |
|---|---|
| seq_parameter_set_rbsp( ) { | Descriptor |
| ...... | |
|     sps_mts_enabled_flag | u(1) |
|     if( sps_mts_enabled_flag ) { | |
|         sps_explicit_mts_intra_enabled_flag | u(1) |
|         sps_explicit_mts_inter_enabled_flag | u(1) |
|     } | |
|     ...... | |
|     *sps_st_enabled_flag* | *u(1)* |
|     ...... | |
| } | |

| Residual coding syntax<br>residual_coding( x0, y0, log2TbWidth, log2TbHeight, cIdx ) {<br>...<br>    if( coded_sub_block_flag[ xS ][ yS ] && ( n > 0 \|\| !inferSbDcSigCoeffFlag ) && ( xC != LastSignificantCoeffX \|\| yC != LastSignificantCoeffY ) ) {<br>        sig_coeff_flag[ xC ][ yC ]<br>        remBinsPass1- -<br>        if( sig_coeff_flag[ xC ][ yC ] )<br>            inferSbDcSigCoeffFlag = 0<br>    }<br>    if( sig_coeff_flag[ xC ][ yC ] ) {<br>    *if( !transform_skip_flag[ x0 ][ y0 ]) {*<br>        *numSigCoeff++*<br>        *if( ( ( ( log2TbWidth == 2 && log2TbHeight == 2 ) \|\| ( log2TbWidth == 3 && log2TbHeight == 3 ) ) && n >= 8 && i == 0 ) \|\| ( ( log2TbWidth >= 3 & & log2TbHeight >= 3 && ( i == 1 \|\| i == 2 ) ) ) ) {*<br>        *numZeroOutSigCoeff++*<br>        }<br>    }<br>        ***abs_level_gt1_flag*[ *n* ]<br>} | Descriptor<br><br><br><br><br>ae(v)<br><br><br><br><br><br><br><br><br><br><br><br><br><br>*ae(v)*** |

| Coding unit syntax | |
|---|---|
| coding_unit( x0, y0, cbWidth, cbHeight, treeType ) {<br>...<br>    if( !pcm_flag[ x0 ][ y0 ] ) {<br>        if( CuPredMode[ x0 ][ y0 ] != MODE_INTRA && merge_flag[ x0 ][ y0 ] = = 0)<br>            cu_cbf<br>        if( cu_cbf ) {<br>            if( CuPredMode[ x0 ][ y0 ] = = MODE_INTER && sps_sbt_enabled_flag &&<br>                !ciip_flag[ x0 ][ y0 ] ) {<br>                if( cbWidth <= MaxSbtSize && cbHeight <= MaxSbtSize ) {<br>                      allowSbtVerH = cbWidth >= 8<br>                      allowSbtVerQ = cbWidth >= 16<br>                      allowSbtHorH = cbHeight >= 8<br>                      allowSbtHorQ = cbHeight >= 16<br>                      if( allowSbtVerH \|\| allowSbtHorH \|\| allowSbtVerQ \|\| allowSbtHorQ )<br>                          cu_sbt_flag<br>                }<br>                if( cu_sbt_flag ) {<br>                      if( ( allowSbt VerH \|\| allowSbtHorH ) && ( allowSbtVerQ \|\| allowSbtHorQ) )<br>                          cu_sbt_quad_flag<br>                  if( ( cu_sbt_quad_flag && allowSbtVerQ && | Descriptor<br><br><br><br><br>ae(v)<br><br><br><br><br><br><br><br><br><br><br><br><br><br>ae(v)<br><br><br><br>ae(v) |

-continued

Coding unit syntax

```
allowSbtHorQ ) ||
                ( !cu_sbt_quad_flag && allowSbtVerH
&& allowSbtHorH ) )
                cu_sbt_horizontal_flag                          ae(v)
                cu_sbt_pos_flag                                 ae(v)
            }
        }
    numZeroOutSigCoeff = 0
        transform_tree( x0, y0, cbWidth, cbHeight, treeType )
    if( Min( cbWidth, cbHeight ) >= 4 && sps_st_enabled_flag == 1 &&
CuPredMode[ x0 ][ y0 ] == MODE_INTRA
&& IntraSubPartitionsSplitType == ISP_NO_SPLIT ) {
        if( ( numSigCoeff > ( ( treeType == SINGLE_TREE ) ? 2 : 1 ) ) &&
numZeroOutSigCoeff == 0 ) {
            st_idx[ x0 ][ y0 ]                                  ae(v)
        }
    }
        }
    }
}
```

Sequence parameter set raw byte sequence payload (RBSP) semantics sps_st_enabled_flag equal to 1 specifies that st_idx may be present in the residual coding syntax for intra coding units. sps_st_enabled_flag equal to 0 specifies that st_idx is not present in the residual coding syntax for intra coding units.

Coding Unit Semantics st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

Transformation process for scaled transform coefficients

General

Inputs to this process are:
a luma location (xTbY, yTbY) specifying the top-left sample of the current luma transform block relative to the top-left luma sample of the current picture,
a variable nTbW specifying the width of the current transform block,
a variable nTbH specifying the height of the current transform block,
a variable cIdx specifying the colour component of the current block,
an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

If st_idx[xTbY][yTbY] is not equal to 0, the following applies:
1. The variables nStSize, log 2StSize, numStX, numStY, and nonZeroSize are derived as follows:
   If both nTbW and nTbH are greater than or equal to 8, log 2StSize is set to 3 and nStOutSize is set to 48.
   Otherwise, log 2StSize is set to 2 and nStOutSize is set to 16.
   nStSize is set to (1<<log 2StSize).
   If nTbH is equal to 4 and nTbW is greater than 8, numStX set equal to 2.
   Otherwise, numStX set equal to 1.
   If nTbW is equal to 4 and nTbH is greater than 8, numStY set equal to 2.
   Otherwise, numStY set equal to 1.
   If both nTbW and nTbH are equal to 4 or both nTbW and nTbH are equal to 8, nonZeroSize is set equal to 8.
   Otherwise, nonZeroSize set equal to 16.
2. For xSbIdx=0 . . . numStX−1 and ySbIdx=0 . . . numStY−1, the following applies:
   The variable array u[x] with x=0 . . . nonZeroSize−1 are derived as follows:
       xC=(xSbIdx<<log 2StSize)+DiagScanOrder[log 2StSize][log 2StSize][x][0]
       yC=(ySbIdx<<log 2StSize)+DiagScanOrder[log 2StSize][log 2StSize][x][1]
       u[x]=d[xC][yC]
   u[x] with x=0 . . . nonZeroSize−1 is transformed to the variable array v[x] with x=0 . . . nStOutSize−1 by invoking the one-dimensional transformation process as specified in clause 8.7.4.4 with the transform input length of the scaled transform coefficients nonZeroSize, the transform output length nStOutSize the list u[x] with x=0 . . . nonZeroSize−1, the index for transform set selection stPredModeIntra, and the index for transform selection in a transform set st_idx[xTbY][yTbY] as inputs, and the output is the list v[x] with x=0 . . . nStOutSize−1. The variable stPredModeIntra is set to the predModeIntra specified in clause 8.4.4.2.1.
   The array d[(xSbIdx<<log 2StSize)+x][(ySbIdx<<log 2StSize)+y] with x=0 . . . nStSize−1, y=0 . . . nStSize−1 are derived as follows:
   If stPredModeIntra is less than or equal to 34, or equal to INTRA_LT_CCLM, INTRA_T_CCLM, or INTRA_L_CCLM, the following applies:
       d[(xSbIdx<<log 2StSize)+x][(ySbIdx<<log 2StSize)+y]=(y<4)?v[x+(y<<log 2StSize)]:((x<4)?v[32+x+((y−4)<<2)]:
       d[(xSbIdx<<log 2StSize)+x][(ySbIdx<<log 2StSize)+y])

Otherwise, the following applies:
d[(xSbIdx<<log 2StSize)+x][(ySbIdx<<log 2StSize)+y]=(y<4)?v[y+(x<<log 2StSize)]:
((x<4)?v[32+(y-4)+(x<<2)]:
d[(xSbIdx<<log 2StSize)+x][(ySbIdx<<log 2StSize)+y])

Secondary Transformation Process
Inputs to this process are:
   a variable nTrS specifying the transform output length,
   a variable nonZeroSize specifying the transform input length,
   a list of transform input x[j] with j=0 . . . nonZeroSize-1,
   a variable stPredModeIntra specifying the index for transform set selection,
   a variable stIdx specifying the index for transform selection in a set.
Output of this process is the list of transformed samples y[i] with i=0 . . . nTrS-1.
The transformation matrix derivation process as specified in clause 8.7.4.5 is involved with the transform output length nTrS, the index for transform set selection stPredModeIntra, and the index for transform selection in a transform set stIdx as inputs, and the transformation matrix secTransMatrix as output.
The list of transformed samples y[i] with i=0 . . . nTrS-1 is derived as follows:
y[i]=Clip3(CoeffMin, CoeffMax, (($\Sigma_{j>0}^{nonZeroSize-1}$ secTransMatrix[j][i]*x[j])+64)>>7) with i=0 . . . nTrS-1
CoeffMin=-(1<<15) and CoeffMax=(1<<15)-1;

Secondary Transformation Matrix Derivation Process
Inputs to this process are:
   a variable nTrS specifying the transform output length,
   a variable stPredModeIntra specifying the index for transform set selection,
   a variable stIdx specifying the index for transform selection in the designated transform set.
Output of this process is the transformation matrix secTransMatrix.
The variable stTrSetIdx is derived as follows:

| stPredModeIntra | stTrSetIdx |
| --- | --- |
| stPredModeIntra < 0 | 1 |
| 0 <= stPredModeIntra <= 1 | 0 |
| 2 <= stPredModeIntra <= 12 | 1 |
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra | 1 |

The transformation matrix secTransMatrix is derived based on nTrS, stTrSetIdx, and stIdx as follows:
   If nTrS is equal to 16, stTrSetIdx is equal to 0, and stIdx is equal to 1, the following applies: secTransMatrix[m][n]= . . . .
   If nTrS is equal to 16, stTrSetIdx is equal to 0, and stIdx is equal to 2, the following applies: secTransMatrix[m][n]= . . . .
   If nTrS is equal to 16, stTrSetIdx is equal to 1, and stIdx is equal to 1, the following applies: secTransMatrix[m][n]= . . . .
   If nTrS is equal to 16, stTrSetIdx is equal to 1, and stIdx is equal to 2, the following applies: secTransMatrix[m][n]= . . . .
   If nTrS is equal to 16, stTrSetIdx is equal to 2, and stIdx is equal to 1, the following applies: secTransMatrix[m][n]= . . . .
   If nTrS is equal to 16, stTrSetIdx is equal to 2, and stIdx is equal to 2, the following applies: secTransMatrix[m][n]= . . . .
   If nTrS is equal to 16, stTrSetIdx is equal to 3, and stIdx is equal to 1, the following applies: secTransMatrix[m][n]= . . . .
   If nTrS is equal to 16, stTrSetIdx is equal to 3, and stIdx is equal to 2, the following applies: secTransMatrix[m][n]= . . . .
   If nTrS is equal to 48, stTrSetIdx is equal to 0, and stIdx is equal to 1 the following applies: secTransMatrix[m][n]= . . . .
   If nTrS is equal to 48, stTrSetIdx is equal to 0, and stIdx is equal to 2 the following applies: secTransMatrix[m][n]= . . . .
   If nTrS is equal to 48, stTrSetIdx is equal to 1, and stIdx is equal to 1 the following applies: secTransMatrix[m][n]= . . . .
   If nTrS is equal to 48, stTrSetIdx is equal to 1, and stIdx is equal to 2 the following applies: secTransMatrix[m][n]= . . . .
   If nTrS is equal to 48, stTrSetIdx is equal to 2, and stIdx is equal to 1 the following applies: secTransMatrix[m][n]= . . . .
   If nTrS is equal to 48, stTrSetIdx is equal to 2, and stIdx is equal to 2 the following applies: secTransMatrix[m][n]= . . . .
   If nTrS is equal to 48, stTrSetIdx is equal to 3, and stIdx is equal to 1 the following applies: secTransMatrix[m][n]= . . . .
   If nTrS is equal to 48, stTrSetIdx is equal to 3, and stIdx is equal to 2 the following applies: secTransMatrix[m][n]= . . . .

2.11 Clipping of Dequantization in HEVC

In HEVC, the scaled transform coefficient d' is calculated as d'=Clip3(coeffMin, coeffMax, d), where d is the scaled transform coefficient before clipping.

For luma component, coeffMin=CoeffMinY; coeffMax=CoeffMaxY. For chroma components, coeffMin=CoeffMinC; coeffMax=CoeffMaxC; where
   CoeffMinY=-(1<<(extended_precision_processing_flag?Max(15,BitDepthY+6):15))
   CoeffMinC=-(1<<(extended_precision_processing_flag?Max(15,BitDepthC+6):15))
   CoeffMaxY=(1<<(extended_precision_processing_flag?Max(15,BitDepthY+6):15))-1
   CoeffMaxC=(1<<(extended_precision_processing_flag?Max(15,BitDepthC+6):15))-1
   extended_precision_processing_flag is a syntax element signaled in SPS.

2.12 Affine Linear Weighted Intra Prediction (ALWIP, a.k.a., Matrix-Based Intra Prediction, MIP)

In some embodiments, two tests are conducted. In test 1, ALWIP is designed with a memory restriction of 8K bytes and at most 4 multiplications per sample. Test 2 is similar to test 1, but further simplifies the design in terms of memory requirement and model architecture.
   Single set of matrices and offset vectors for all block shapes.
   Reduction of number of modes to 19 for all block shapes.
   Reduction of memory requirement to 5760 10-bit values, that is 7.20 Kilobyte.

Linear interpolation of predicted samples is carried out in a single step per direction replacing iterative interpolation as in the first test.

2.13 Sub-Block Transform

For an inter-predicted CU with cu_cbf equal to 1, cu_sbt_ flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

Figure 15:
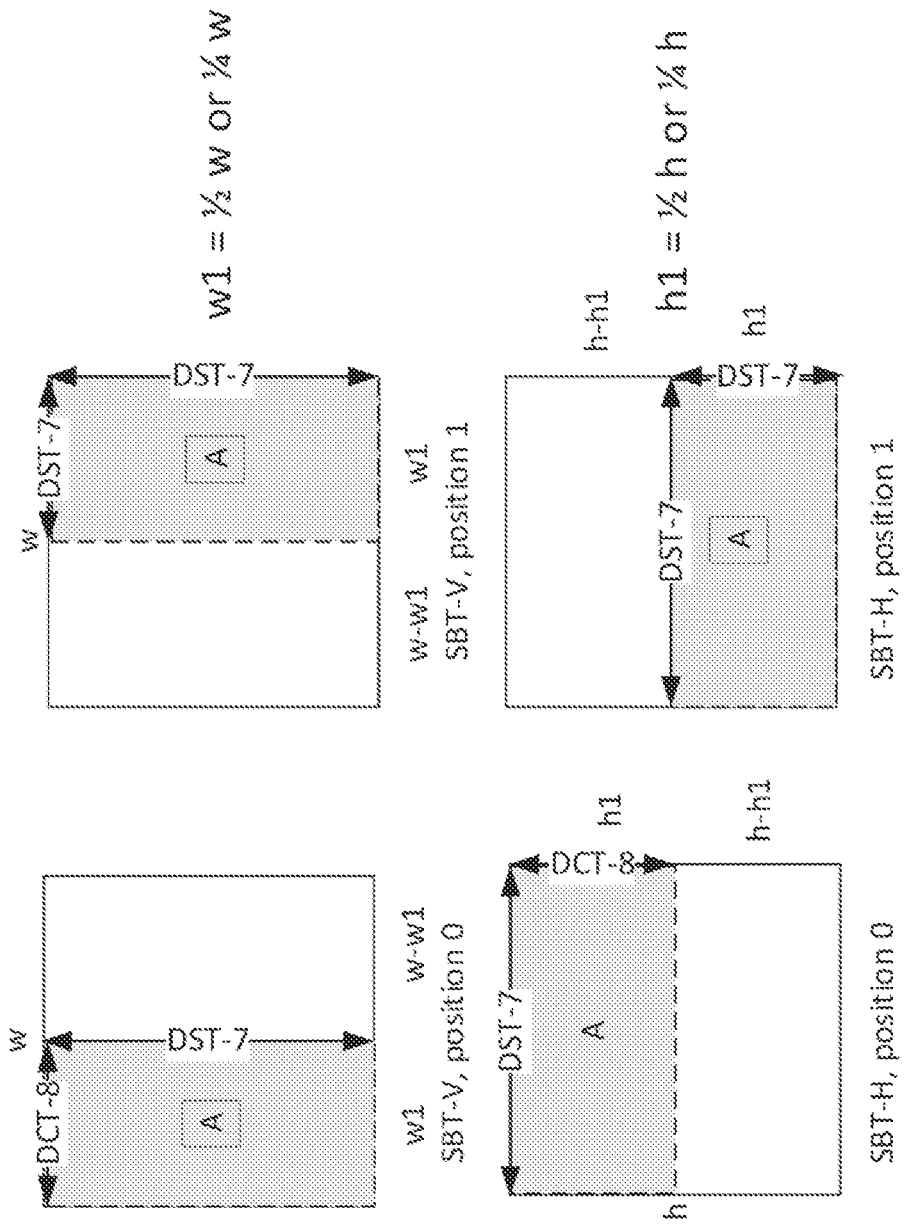
FIG. 15 is an illustration of sub-block transform modes vertical sub-block transform (SBT-V) and horizontal sub-block transform (SBT-H).
Figure 16:
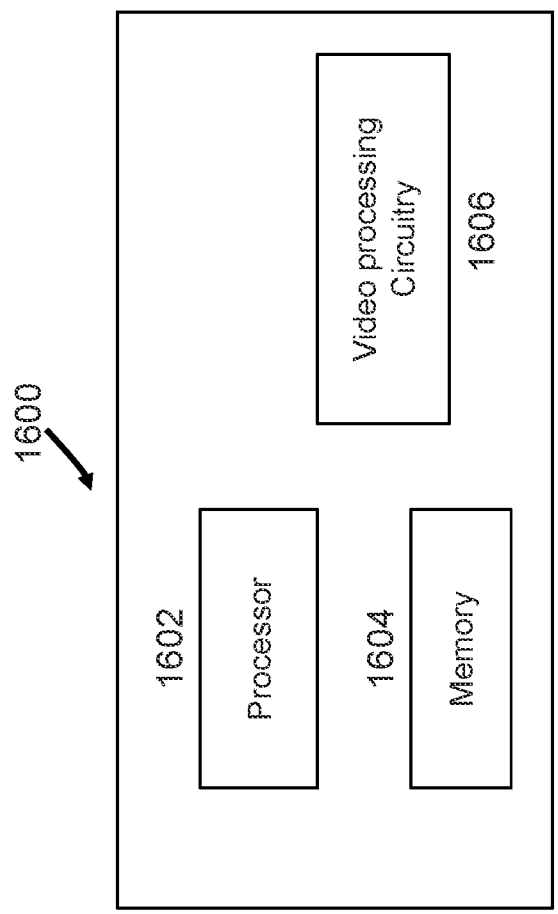
FIG. 16 is a block diagram of an example hardware platform for implementing a technique described in the present disclosure.

FIG. 15 is an illustration of sub-block transform modes SBT-V and SBT-H.

3. Examples of Problems Solved by Embodiments

The current design has the following problems:
(1) The clipping and shifting/rounding operations in MTS/RST may not be optimal.
(2) The RST applied on two adjacent 4×4 blocks may be costly.
(3) RST may be done in different ways for different color components.
(4) RST may not work well for screen content coding.
(5) The interaction between RST and other coding tools is unclear.
(6) The transform matrix of RST may be stored more efficiently.
(7) How to apply quantization matrix on RST is unclear.

4. Example Embodiments and Techniques

The listing of embodiments below should be considered as examples to explain general concepts. These embodiments should not be interpreted in a narrow way. Furthermore, these embodiments can be combined in any manner.

In the following description, coding information may include prediction mode (e.g., intra/inter/IBC mode), motion vector, reference picture, inter prediction direction, intra prediction mode, combined intra inter prediction (CIIP) mode, ISP mode, affine intra mode, employed transform core, transform skip flag etc., e.g., information required when encoding a block.

In the following discussion, SatShift(x, n) is defined as:

$$SatShift(x, n) = \begin{cases} (x + \text{offset0}) \gg n & \text{if } x \geq 0 \\ -((-x + \text{offset1}) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n-1)). In another example, offset0 and/or offset1 are set to 0.

In another example, offset0=offset1=((1<<n)>>1)-1 or ((1<<(n-1)))-1.

Clip3(min, max, x) is defined as:

$$Clip3(\text{Min}, \text{Max}, x) = \begin{cases} \text{Max} & \text{if } x < \text{Min} \\ \text{Min} & \text{if } x < \text{Max} \\ x & \text{Otherwise} \end{cases}$$

1. After the invert RST, the output value should be clipped to the range of [MinCoef, MaxCoef], inclusively, where MinCoef and/or MaxCoef are two integer values which may be variable.
   a. In one example, suppose a coefficient after dequantization is clipped to the range of [QMinCoef, QMaxCoef] inclusively, then MinCoef may be set equal to QMinCoef and/or MaxCoef may be set equal to QMaxCoef.
   b. In one example, MinCoef and/or MaxCoef may depend on the color component.
      i. In one example, MinCoef and/or MaxCoef may depend on the bit-depth of the corresponding color component.
   c. In one example, MinCoef and/or MaxCoef may depend on the block shape (e.g., square or non-square) and/or block dimensions.
   d. In one example, the value or the selection of candidate values of MinCoef and/or MaxCoef may be signaled, such as in SPS, PPS, slice header/tile group header/CTU/CU.
   e. In one example, for a Luma component, MinCoef and/or MaxCoef may be derived as:
   MinCoef=-(1<<(extended_precision_processing_flag?Max(15, BitDepthY+6): 15))
   MaxCoef=(1<<(extended_precision_processing_flag?Max(15, BitDepthY+6): 15))-1,
   where BitDepth Y is the bit-depth of the luma component and
   extended_precision_processing_flag may be signaled such as in SPS.
   f. In one example, for a component, MinCoef and/or MaxCoef may be derived as:
   MinCoef=(1<<(extended_precision_processing_flag?Max(15, BitDepthC+6): 15))
   MaxCoef=(1<<(extended_precision_processing_flag?Max(15, BitDepthC+6): 15))-1,
   where BitDepthC is the bit-depth of the chroma component and
   extended_precision_processing_flag may be signaled such as in SPS.
   g. In some embodiments, MinCoef is -(1<<15) and MaxCoef is (1<<15)-1.
   h. In one example, a conformance bitstream shall satisfy that the transform coefficients after the forward RST shall be within a given range.
2. It is proposed that the way to apply forward RST and/or invert RST on a M×N sub-block of coefficients may depend on the number of sub-blocks that forward RST and/or invert RST is applied to, e.g., M=N=4.
   a. In one example, the zeroing-out range may depend on the sub-block index that RST is applied to.
      i. Alternatively, the zeroing-out range may depend on the number of sub-blocks that RST is applied to.

b. In one example, the way to apply forward RST and/or invert RST on the first sub-block and on the second sub-block of coefficients may be different, when there are S sub-blocks that forward RST and/or invert RST is applied to, in a whole coefficient block, where S>1, e.g., S=2. For example, the first M×N sub-block may be the top-left M×N sub-block.
  i. In one example, nonZeroSize as described in section 2.10 may be different for the first M×N sub-block of coefficients (denoted as nonZero-Size0) and for the second M×N sub-block of coefficients (denoted as nonZeroSize1).
    1) In one example, nonZeroSize0 may be larger than nonZeroSize1. For example, nonZero-Size0-16 and nonZeroSize1=8.
  ii. In one example, nonZeroSize as described in section 2.10 may be different when is only one M×N sub-block to be applied forward RST and/or invert RST, or there is more than one M×N sub-blocks to be applied forward RST and/or invert RST.
    1) In one example, nonZeroSize may be equal to 8 if there is more than one M×N sub-blocks to be applied forward RST and/or invert RST.
3. It is proposed to apply forward RST and/or invert RST on only one M×N sub-block (such as the top-left M×N sub-block) of coefficients, if the current block size is 4×H or W×4, where H>8 and W>8. E.g., M=N=4.
  a. In one example, forward RST and/or invert RST is applied on only one M×N sub-block of coefficients if H>T1 and/or W>T2. e.g., T1=T2=16.
  b. In one example, forward RST and/or invert RST is applied on only one M×N sub-block of coefficients if H<T1 and/or W<T2. e.g., T1=T2=32.
  c. In one example, forward RST and/or invert RST is applied on only one M×N sub-block of coefficients for all H>8 and/or W>8.
  d. In one example, forward RST and/or invert RST is applied on only one M×N sub-block (such as the top-left M×N sub-block), if the current block size is M×H or W×N, where H>=N and W>=M. E.g., M=N=4
4. RST may be applied to non-square regions. Suppose the region size is denoted by K×L where K is not equal to L.
  a. Alternatively, furthermore, zeroing-out may be applied to the transform coefficients after forward RST so that the maximum number of non-zero coefficients is satisfied.
    i. In one example, the transform coefficients may be set to 0 if they are located outside the top-left M×M region wherein M is no larger than K and M is no larger than L.
5. It is proposed that coefficients in two adjacent M×N sub-blocks may be involved in a single forward RST and/or invert RST. E.g., M=N=4.
  a. In an example, one or several operations as below may be conducted at encoder. The operations may be conducted in order.
    i. The coefficients in two adjacent M×N sub-blocks are rearranged into a 1-D vector with 2×M×N elements
    ii. A forward RST with a transform matrix with 2×M×N columns and M×N rows (or M×N columns and 2×M×N rows) is applied on the 1-D vector.
    iii. The transformed 1-D vector with M×N elements are rearranged into the first M×N sub-block (such as the top-left sub-block).
    iv. All coefficients in the second M×N sub-block may be set as zero.
  b. In an example, one or several operations as below may be conducted at decoder. The operations may be conducted in order.
    i. The coefficients in the first M×N sub-block (such as the top-left sub-block) are rearranged into a 1-D vector with M×N elements
    ii. An invert RST with a transform matrix with M×N columns and 2×M×N rows (or 2×M×N columns and M×N rows) is applied on the 1-D vector.
    iii. The transformed 1-D vector with 2×M×N elements are rearranged into the two adjacent M×N sub-blocks.
  c. In one example, a block may be split into K (K>1) sub-blocks, and both major and secondary transform may be performed at sub-block level.
6. The zeroing-out range (e.g., nonZeroSize as described in section 2.10) may depend on the color component.
  a. In one example, for the same block dimension, the range may be different for luma and chroma components.
7. The zeroing-out range (e.g., nonZeroSize as described in section 2.10) may depend on the coded information.
  a. In one example, it may depend on the coded mode, such as intra or non-intra mode.
  b. In one example, it may depend on the coded mode, such as intra or inter or IBC mode.
  c. In one example, it may depend on the reference pictures/motion information.
8. It is proposed that zeroing-out range (e.g., nonZeroSize as described in section 2.10) for specific block dimensions may depend on the Quantization Parameter (QP).
  a. In one example, suppose nonZeroSize is equal to nonZeroSizeA when QP is equal QPA and nonZeroSize is equal to nonZeroSizeB when QP is equal QPB. If QPA is no smaller than QPB, then nonZeroSizeA is no larger than nonZeroSizeB.
  b. Different transform/inv-transform matrices may be used for different nonZeroSize.
9. It is proposed that zeroing-out range (e.g., nonZeroSize as described in section 2.10) may be signaled, such as in sequence parameter set (SPS), picture parameter set (PPS), picture header, slice header, tile group header, coding tree unit (CTU) row, CTU, CU or any video data unit.
  a. Alternatively, multiple ranges may be defined. And the indication of which candidate nonZeroSize is selected may be signaled, such as in SPS, PPS, picture header, slice header, tile group header, CTU row, CTU and CU.
10. Whether and/or how to apply RST may depend on the color format, and/or usage of separate plane coding, and/or color component.
  a. In one example, RST may not be applied on chroma components (such as Cb and/or Cr).
  b. In one example, RST may not be applied on chroma components if the color format is 4:0:0.
  c. In one example, RST may not be applied on chroma components if separate plane coding is used.
  d. In one example, nonZeroSize for specific block dimensions may depend on color components.

i. In one example, nonZeroSize on chroma components may be smaller than nonZeroSize on the luma component for the same block dimensions.
11. It is proposed that the RST controlling information (such as whether RST is applied, and/or which group of transform matrix is selected) may be signaled separately for luma and chroma components, when the components are coded with a single coding structure tree.
12. Whether and how to apply RST may depend on coding information (such as coding mode) of the current block and/or neighbouring blocks.
   a. In one example, RST cannot be used for one or multiple specific intra-prediction modes.
      i. For example, RST cannot be used for the linear model (LM) mode.
      ii. For example, RST cannot be used for the LM-T mode.
      iii. For example, RST cannot be used for the LM-A mode.
      iv. For example, RST cannot be used for wide angle intra-prediction modes.
      v. For example, RST cannot be used for BDPCM mode or/and DPCM mode or/and RBDPCM modes.
      vi. For example, RST cannot be used for ALWIP mode.
      vii. For example, RST cannot be used for some specific angular intra-prediction modes (such as DC, Planar, Vertical, Horizontal, etc.).
      viii. For example, RST may be used for luma component but not for chroma component in LM mode or/and LM-T mode or/and LM-A mode.
      ix. For example, RST may be not used for chroma component when joint chroma residual coding is applied.
   b. If RST cannot be applied, the syntax elements to indicate information related RST in the current block may not be signaled.
13. It is proposed that RST may be applied on blocks that is not intra-coded.
   a. In one example, RST may be applied on an inter-coded block.
   b. In one example, RST may be applied on an intra block copy (IBC)-coded block.
   c. In one example, RST may be applied on a block coded with combined inter-intra prediction (CIIP).
14. It is proposed that RST may be controlled at different levels.
   a. For example, the information to indicate whether RST (such as a control flag) is applicable or not may be signaled in PPS, slice header, picture header, tile group header, tile, CTU row, CTU.
   b. Whether RST is applicable may depend on standard profiles/levels/tiers.
15. It is proposed that whether Position Dependent intra Prediction Combination (PDPC) is applied may depend on whether RST is applied.
   a. In one example, PDPC may not be applied if the current block applied RST.
   b. In one example, PDPC may be applied if the current block applied RST.
   c. Alternatively, whether RST is applied may depend on whether PDPC is applied.
      i. In one example, RST is not applied when PDPC is applied.
      ii. If RST cannot be applied, the syntax elements to indicate information related RST in the current block may not be signaled.
16. It is proposed that whether neighbouring samples used for intra-prediction are filtered may depend on whether RST is applied.
   a. In one example, neighbouring samples may not be filtered if the current block applied RST.
   b. In one example, neighbouring samples may be filtered if the current block applied RST.
   c. Alternatively, whether RST is applied may depend on whether neighbouring samples used for intra-prediction are filtered.
      i. In one example, RST is not applied when neighbouring samples used for intra-prediction are filtered.
      ii. In one example, RST is not applied when neighbouring samples used for intra-prediction are not filtered.
      iii. If RST cannot be applied, the syntax elements to indicate information related RST in the current block may not be signaled.
17. It is proposed that RST may be applied when the current block is coded with transform skip.
   a. For example, the major transform is skipped, but the second transform may still be applied.
   b. Secondary transform matrices used in transform skip mode may be different from that are used in none transform skip mode.
18. It is proposed that the transform matrices used for RST may be stored with bit-width less than 8. For example, the transform matrices used for RST may be stored with bit-width 6 or 4.
19. It is proposed that the transform matrices used for RST may be stored in a predictive way.
   a. In one example, a first element in a first transform matrix for RST may be predicted by a second element in the first transform matrix for RST.
      i. For example, the difference between the two elements may be stored.
      ii. For example, the difference may be stored with bit-width less than 8, such as 6 or 4.
   b. In one example, a first element in a first transform matrix for RST may be predicted by a second element in the second transform matrix for RST.
      i. For example, the difference between the two elements may be stored.
      ii. For example, the difference may be stored with bit-width less than 8, such as 6 or 4.
20. It is proposed that a first transform matrix for RST may be derived from a second transform matrix for RST.
   a. In one example, partial elements of the second transform matrix for RST may be picked up to build the first transform matrix for RST.
   b. In one example, the first transform matrix for RST by be derived by rotating or flipping on the whole or a part of the second transform matrix for RST.
   c. In one example, the first transform matrix for RST by be derived by down-sampling or up-sampling on the second transform matrix for RST.
21. It is proposed that the syntax elements to indicate information related RST in the current block may be signaled before residues (may be transformed) are signaled.

a. In one example, the signaling of information related RST may not depend on the non-zero or zero coefficients counted when parsing the residues.
b. In one example, the non-zero or zero coefficients may not be counted when parsing the residues.
c. In one example, the coded block flag (cbf) flags for sub-blocks which are set to be all-zero by RST may not be signaled and inferred to be 0.
d. In one example, the significant flag for a coefficient which is set to be zero by RST may not be signaled and inferred to be 0.
e. The scanning order to parse the residue block may depend whether and how to apply RST.
　i. In one example, the coefficients which are set to be zero by RST may not be scanned.
f. The arithmetic coding contexts to parse the residue block may depend on whether and how to apply RST.
22. It is proposed that whether and how to apply quantization matrix may depend on whether and how to apply RST.
a. In one example, different quantization matrix may be applied whether RST is applied or not.
b. Alternatively, whether and how to apply RST may depend on whether and how to apply quantization matrix.
　i. In one example, RST may not be applied when quantization matrix is applied on a block.
23. It is proposed that RST may be applied to quantized coefficients/residual.
a. In one example, RST may be applied to residuals when transform skip is used.
b. In one example, RST may be applied to quantized transformed coefficients of a block.
24. It is proposed that RST may be applied to sub-block transform blocks.
a. In one example, RST may be applied to the upper-left coefficients generated by sub-block transform.

FIG. 1600 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606. The processor(s) 1602 may be configured to implement one or more methods described in the present disclosure. The memory (memories) 1604 may be used for storing data and code used for implementing the methods and techniques described herein. The video processing hardware 1606 may be used to implement, in hardware circuitry, some techniques described in the present disclosure.

Figure 17:
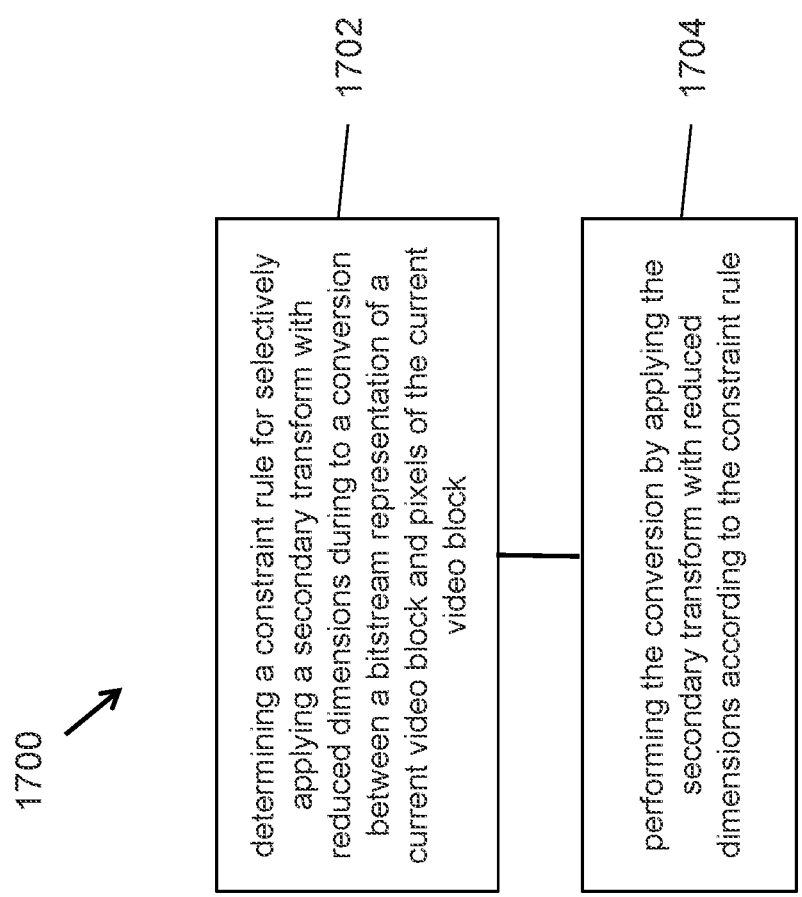
FIG. 17 is a flowchart of an example method of video processing.

FIG. 17 is a flowchart for an example method 1700 of video processing. The method 1700 includes determining (1702) a constraint rule for selectively applying a secondary transform with reduced dimensions during to a conversion between a bitstream representation of a current video block and pixels of the current video block. The method 1700 includes performing (1704) the conversion by applying the secondary transform with reduced dimensions according to the constraint rule. The secondary transform with reduced dimensions has dimensions reduced from a dimension of the current video block. The secondary transform with reduced dimensions is applied in a specific order together with a primary transform during the conversion.

Additional embodiments and techniques are as described in the following examples.

1. A video processing method, comprising: determining a constraint rule for selectively applying a secondary transform with reduced dimensions during to a conversion between a bitstream representation of a current video block and pixels of the current video block, and performing the conversion by applying the secondary transform with reduced dimensions according to the constraint rule; wherein the secondary transform with reduced dimensions has dimensions reduced from a dimension of the current video block, and wherein the secondary transform with reduced dimensions is applied in a specific order together with a primary transform during the conversion.

2. The method of example 1, wherein the conversion includes encoding the current video block into the bitstream representation and wherein the specific order includes first applying the primary transform in a forward direction, followed by selectively applying the secondary transform with reduced dimensions in a forward direction followed by quantizing an output of the secondary transform with reduced dimension in the forward direction.

3. The method of example 1, wherein the conversion includes decoding the current video block from the bitstream representation and wherein the specific order includes first applying a dequantization to the bitstream representation, followed by selectively applying the secondary transform with reduced dimensions in an inverse direction followed by applying the primary transform in an inverse direction to an output of the secondary transform with reduced dimensions in the inverse direction.

4. The method of any of example 1 to 3, wherein the constraint rule specifies to clip a range of the output of the secondary transform with reduced dimensions in the inverse direction to a range of [MinCoef, MaxCoef], inclusively, where MinCoef and/or MaxCoef are two integer values that are a function of a condition of the current video block.

5. The method of example 4, wherein the condition of the current video block is a type of color or luma component represented by the current video block.

6. The method of example 1, wherein the constraint rule specifies to apply the secondary transform with reduced dimensions to one or more M×N subblocks of the current video block and zeroing out the remaining subblocks of the current video block.

7. The method of example 1, wherein the constraint rule specifies to apply the secondary transform with reduced dimensions differently to different subblocks of the current video block.

8. The method of any of examples 1 to 5, wherein the constraint rule specifies to apply the secondary transform with reduced dimensions to exactly one M×N subblock of the current video block due to the current video block having a size 4×H or W×4, where H is height in integer pixels and W is width in integer pixels.

9. The method of example 8, wherein H>8 or W>8.

10. The method of any of examples 1 to 9, wherein the current video block is a non-square region of video.

11. The method of examples 2 or 3, wherein the constraint rule specifies to zero out transform coefficients of the primary transform in the forward direction or padding zero coefficients to an output of the secondary transform in the reverse direction.

Further embodiments of examples 1-5 are described in item 1 in Section 4. Further embodiments of examples 6-7 are described in item 2 in section 4. Further embodiments of examples 8-9 are described in item 3 of section 4. Further embodiments of examples 10-11 are described in item 4 of section 4.

12. A video processing method, comprising: determining a constraint rule for selectively applying a secondary transform with reduced dimensions during to a conversion between a bitstream representation of a current video block and a neighboring video region and pixels of the current video block and pixels of the neighboring region, and performing the conversion by applying the secondary transform with reduced dimensions according to the constraint rule; wherein the secondary transform with reduced dimensions has dimensions reduced from a dimension of the current video block and the neighboring video region, and wherein the secondary transform with reduced dimensions is applied in a specific order together with a primary transform during the conversion.

13. The method of example 12, wherein the neighboring video region comprises a top-left block of the current video block.

14. The method of example 12, wherein the current video block and the neighboring video region correspond to sub-blocks of a parent video block.

Further embodiments of examples 12-14 are described in item 5 of section 4.

15. A video processing method, comprising: determining a zeroing-out rule for selectively applying a secondary transform with reduced dimensions during to a conversion between a bitstream representation of a current video block and pixels of the current video block, and performing the conversion by applying the secondary transform with reduced dimensions according to the zeroing-out rule; wherein the secondary transform with reduced dimensions has dimensions reduced from a dimension of the current video block; wherein the zeroing-out rule specifies a maximum number of coefficients used by the secondary transform with reduced dimensions.

16. The method of example 15, wherein the maximum number of coefficients is a function of component identification of the current video block.

17. The method of example 16, wherein the maximum number of coefficients is different for a luma video block and a chroma video block.

18. The method of any of examples 15 to 17, wherein the zeroing-out rule specifies a zeroing-out range that is a function of coded information of the current video block.

19. The method of any of examples 15 to 17, wherein the zeroing-out rule specifies a zeroing-out range that is a function of a quantization parameter of the current video block.

20. The method of any of examples 15 to 19, wherein the zeroing out range is indicated in the bitstream representation by a field included at a sequence parameter set level, or picture parameter set level, or a picture header, or slice header, or tile group header, or a coding tree unit row, or a coding tree unit, or a coding unit or at a video data unit level.

Further embodiments of examples 15-17 are described in item 6 of section 4. Further embodiments of example 18 are described in item 7 of section 4. Further embodiments of example 19 are described in item 8 of section 4. Further embodiments of example 20 are described in item 9 of section 4.

21. A video processing method, comprising: determining a condition for selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the condition is signaled in the bitstream representation.

22. The method of example 21, wherein the condition is a color format or a usage of a separate plane coding or based on color identity of the current video block.

Further embodiments of examples 21-22 are described in item 10 of section 4.

23. The method of any of examples 21 to 22, wherein the condition is signaled in the bitstream representation separately for chroma and luma components.

Further embodiments of example 23 are described in item 11 of section 4.

24. The method of any of examples 21 to 23, wherein the condition depends on a coding information of the current video block and a neighboring video region.

25. The method of example 24, wherein the condition precludes the applying for the current video block that is coded using a specific intra-prediction mode.

Further embodiments of examples 24-25 are described in item 12 of section 4.

26. The method of example 24, wherein the condition specifies the applying for the current video block that is inter-coded.

27. The method of example 24, wherein the condition specifies the applying for the current video block that is coded using an intra-block copy mode.

Further embodiments of examples 25-26 are described in item 13 of section 4.

28. The method of example 21, wherein the condition is signaled in the bitstream representation at a level such that all blocks within that level comply with the condition, wherein the level is a sequence parameter set level, or picture parameter set level, or a picture header, or slice header, or tile group header, or a coding tree unit row, or a coding tree unit, or a coding unit or at a video data unit level.

Further embodiments of example 28 are described in item 14 of section 4.

29. The method of example 21, wherein the condition is that the current video block is coded using a transform skip mode.

Further embodiments of example 29 are described in item 17 of section 4.

30. A video processing method, comprising: selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the conversion includes selectively applying a Position Dependent intra Prediction Combination (PDPC) based on a coexistence rule.

31. The method of example 30, wherein the coexistence rule excludes applying the PDPC to the current video block due to the applying the secondary transform.

32. The method of example 30, wherein the coexistence rule specifies applying the PDPC to the current video block due to the applying the secondary transform.

33. The method of example 30, wherein the selectively applying the secondary transform is performed for the current video block that uses the PDPC.

Further embodiments of examples 30-33 are described in item 15 of section 4.

34. A video processing method, comprising: applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the applying controls a use of neighboring samples for intra prediction during the conversion.

Further embodiments of example 34 are described in item 16 of section 4.

35. A video processing method, comprising: selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the selectively applying controls a use of quantization matrix during the conversion.

36. The method of example 35, wherein the use of quantization matrix occurs only due to the applying the secondary transform.

Further embodiments of examples 35-36 are described in item 22 of section 4

37. The method of any of examples 1-36, wherein the primary transform and the secondary transform are stored as transform matrices having bit-widths less than 8.

38. The method of any of examples 1-36, wherein the primary transform and the secondary transform are stored as predictive transform matrices.

39. The method of any of examples 1-36, wherein the primary transform is derivable from the secondary transform using a first rule or wherein the secondary transform is derivable from the primary transform using a second rule.

40. The method of any of examples 1-36, wherein the bitstream representation includes information about the secondary transform or the primary transform before residual information for the current video block.

Further embodiments of examples 37-40 are described in items 18, 19, 20 and 21 of section 4.

41. A video processing apparatus comprising a processor configured to implement one or more of examples 1 to 40.

42. A computer-readable medium having code stored thereon, the code, when executed by a processor, causing the processor to implement a method recited in any one or more of examples 1 to 40.

It will be appreciated that the disclosed techniques may be embodied in video encoders or decoders to improve compression efficiency using techniques that include the use of a reduced dimension secondary transform.

Figure 18:
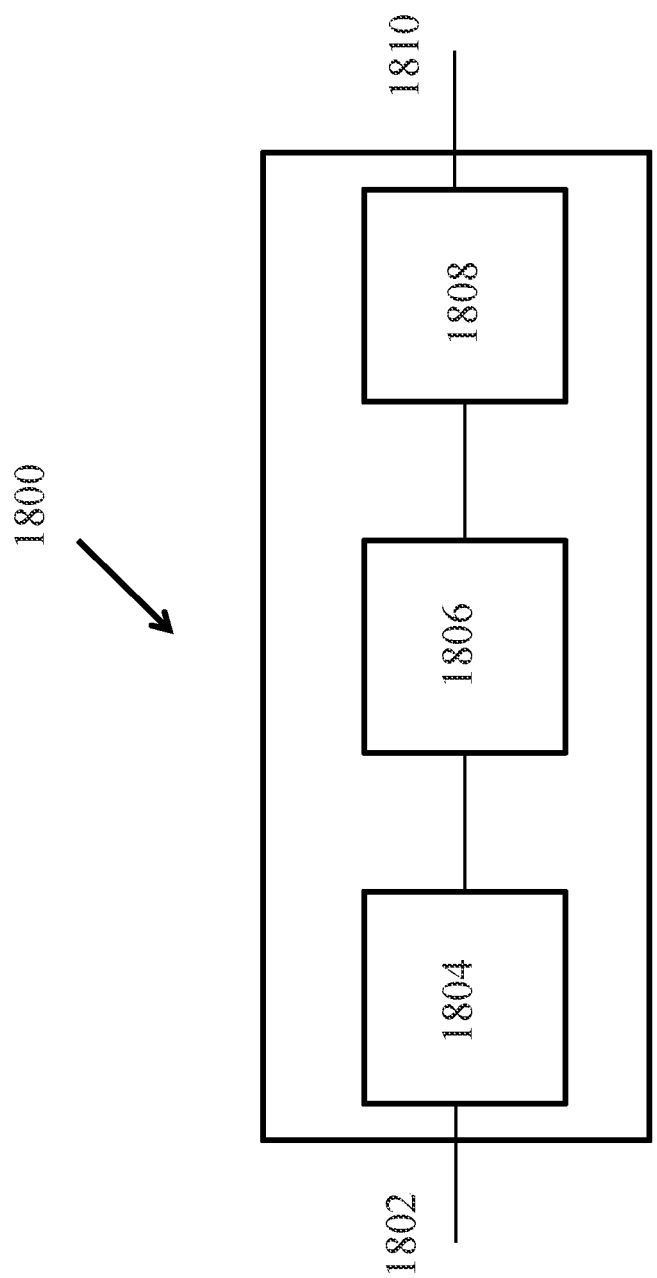
FIG. 18 is a block diagram of an example video processing system in which disclosed techniques may be implemented.

FIG. 18 is a block diagram showing an example video processing system 1800 in which various techniques disclosed herein may be implemented. Various implementations may include some or all of the components of the system 1800. The system 1800 may include input 1802 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1800 may include a coding component 1804 that may implement the various coding or encoding methods described in the present disclosure. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 19:
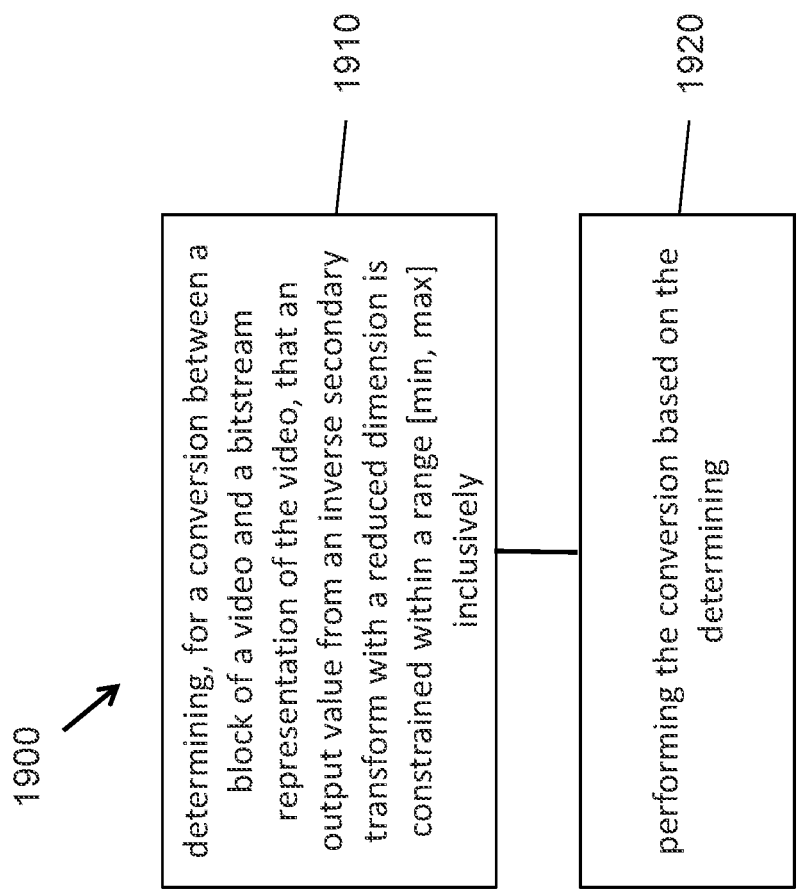
FIG. 19 is a flowchart of an example method of video processing in accordance with the present technology.

FIG. 19 is a flowchart of an example method 1900 of video processing in accordance with the present technology. The method 1900 includes, at operation 1910, determining, for a conversion between a block of a video and a bitstream representation of the video, that an output value from an inverse secondary transform with a reduced dimension is constrained within a range [min, max] inclusively. The inverse secondary transform is applicable to the block between a de-quantization step and an inverse primary transform. The reduced dimension is reduced from a dimension of the block, and min and max are integer values. The method 1900 includes, at operation 1920, performing the conversion based on the determining. In some embodiments, the inverse secondary transform with the reduced dimension comprises an inverse low frequency non-separable transform in which the low frequency corresponds to the reduced dimension.

In some embodiments, a coefficient after the de-quantization step is constrained to [qmin, qmax] inclusively, qmin and qmax being positive integers. At least one of (1) min is equal to qmin, or (2) max is equal to qmax is satisfied. In some embodiments, the range is based on a color component of the block. In some embodiments, at least one of min or max is based on a bit depth of the color component. In some embodiments, the range is based on a shape of the block. In some embodiments, the range is based on whether the block has a square or a non-square shape. In some embodiments, the range is based on a dimension of the block. In some embodiments, at least one of min or max is signaled in the bitstream representation. In some embodiments, the range is signaled in a sequence parameter set, a picture parameter set, a slice header, a tile group header, a coding tree unit, or a coding unit.

In some embodiments, min is $-(1<<(\text{extended\_precision\_processing\_flag?Max}(15, \text{BitDepthY}+6):15))$ and max is $(1<<(\text{extended\_precision\_processing\_flag?Max}(15, \text{BitDepthY}+6):15))$ for a luma component of the block. BitDepthY is a bit-dept of the luma component, and wherein extended_precision_processing_flag is a variable signaled in the bitstream representation.

In some embodiments, min is $-(1<<(\text{extended\_precision\_processing\_flag?Max}(15, \text{BitDepthC}+6):15))$ and max is $(1<<(\text{extended\_precision\_processing\_flag?Max}(15, \text{BitDepthC}+6):15))$ for a chroma component of the block. BitDepthC is a bit-dept of the luma component, and wherein extended_precision_processing_flag is a variable signaled in the bitstream representation.

In some embodiments, min is equal to $-(1<<15)$ and max is equal to $(1<<15)-1$.

In some embodiments, extended_precision_processing_flag is signaled in a sequence parameter set. In some embodiments, coefficients of the block after a second transform applicable between a forward primary transform and a quantization step are constrained within a range.

Figure 20:
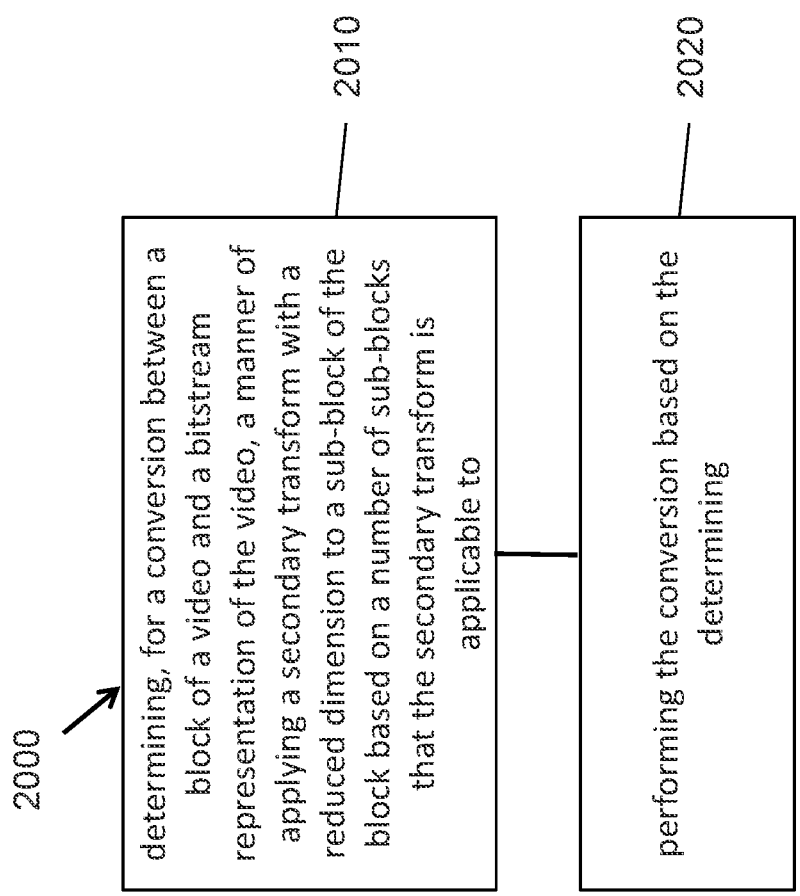
FIG. 20 is a flowchart of another example method of video processing in accordance with the present technology.

FIG. 20 is a flowchart of an example method 2000 of video processing in accordance with the present technology. The method 2000 includes, at operation 2010, determining, for a conversion between a block of a video and a bitstream representation of the video, a manner of applying a secondary transform with a reduced dimension to a sub-block of the block based on a number of sub-blocks that the secondary transform is applicable to. The secondary transform is applicable to the block between a forward primary transform and a quantization step or between a de-quantization step and an inverse primary transform. The reduced dimension is reduced from a dimension of the block. The method 2000 also includes, at operation 2020, performing the conversion based on the determining.

In some embodiments, the secondary transform with the reduced dimension comprises a low frequency non-separable transform, in which the low frequency corresponds to the reduced dimension. In some embodiments, the reduced dimension corresponds to a dimension of the sub-block.

In some embodiments, the sub-block has a dimension of 4×4. In some embodiments, the sub-block is associated with a sub-block index. Coefficients of the subblock that are outside of a non-zero range are set to zero, and the zero-out range is determined based on the sub-block index. In some embodiments, coefficients of the subblock that are outside of a non-zero range are set to zero. The non-zero range is determined based on the number of sub-blocks that the secondary transform is applicable to.

In some embodiments, the number of sub-blocks that the secondary transform is applicable to is greater than 1. The secondary transform is applied to a first sub-block in a first manner, and the secondary transform is applied to a second sub-block in a second manner that is different from the first manner. In some embodiments, coefficients of the first subblock that are outside of a first non-zero range are set to zero. Coefficients of the second subblock that are outside of a second non-zero range are set to zero, and the first non-zero range is different than the second non-zero range. In some embodiments, the first non-zero range is larger than the second non-zero range. In some embodiments, the first non-zero range is represented as 16 and the second non-zero range is represented as 8.

In some embodiments, in case the secondary transform is applied to only one sub-block, coefficients of the only one subblock outside of a first non-zero range are set to zero. In case the low frequency non-separable transform is applied to multiple sub-blocks, coefficients of the multiple subblocks outside of a second non-zero range are set to zero. In some embodiments. The first non-zero range is different than the second non-zero range. In some embodiments, the second non-zero range is represented as 8.

Figure 21:
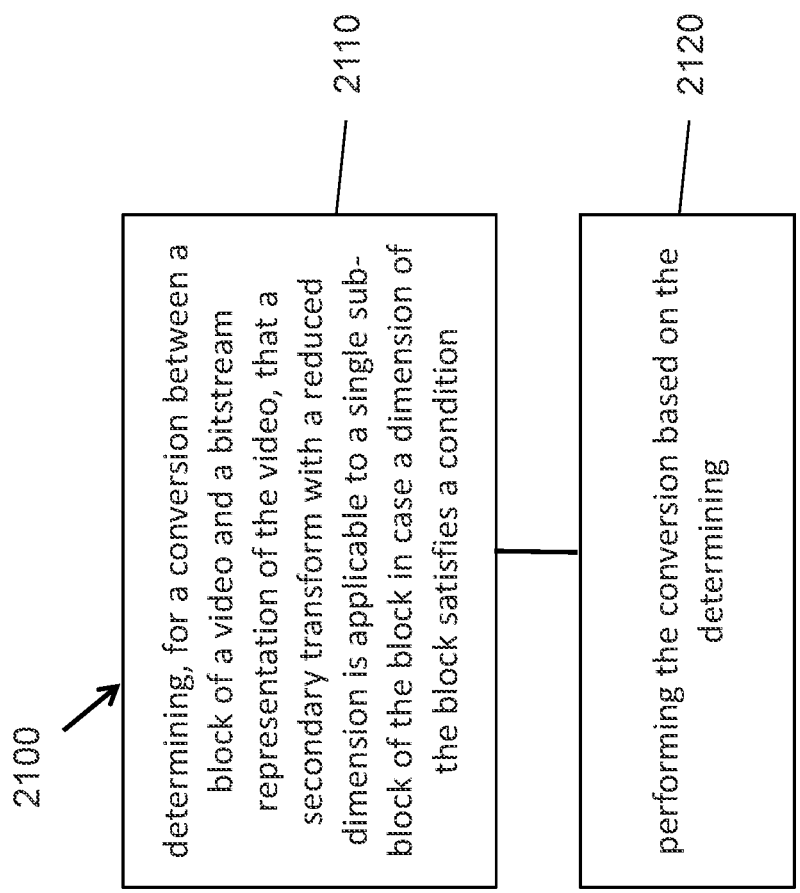
FIG. 21 is a flowchart of another example method of video processing in accordance with the present technology.

FIG. 21 is a flowchart of another example method of video processing in accordance with the present technology. The method 2100 includes, at operation 2110, determining, for a conversion between a block of a video and a bitstream representation of the video, that a secondary transform with a reduced dimension is applicable to a single sub-block of the block in case a dimension of the block satisfies a condition. The secondary transform is performed between a forward primary transform and a quantization step or between a de-quantization step and an inverse primary transform. The reduced dimension is reduced from a dimension of the block. The method 2100 also includes, at operation 2120, performing the conversion based on the determining.

In some embodiments, the reduced dimension corresponds to a dimension of the sub-block. In some embodiments, the single sub-block that secondary transform is applicable to is a top-left sub-block of the current block. In some embodiments, the single sub-block has a dimension of M×N, M and N being positive integers. In some embodiments, M=N=4. In some embodiments, the condition specifies that the dimension of the block is 4×H or W×4, and wherein H>8 and W>8. In some embodiments, at least one of (1) H>T1, or (2) W>T2 is satisfied, T1 and T2 being greater than 8. In some embodiments, T1=T2=16. In some embodiments, at least one of (1) H<T1, or (2) W<T2 is satisfied, T1 and T2 being greater than 8. In some embodiments, T1=T2=32. In some embodiments, the condition specifies that the dimension of the block is M×H or W×N, and wherein H≥N and W≥M.

Figure 22:
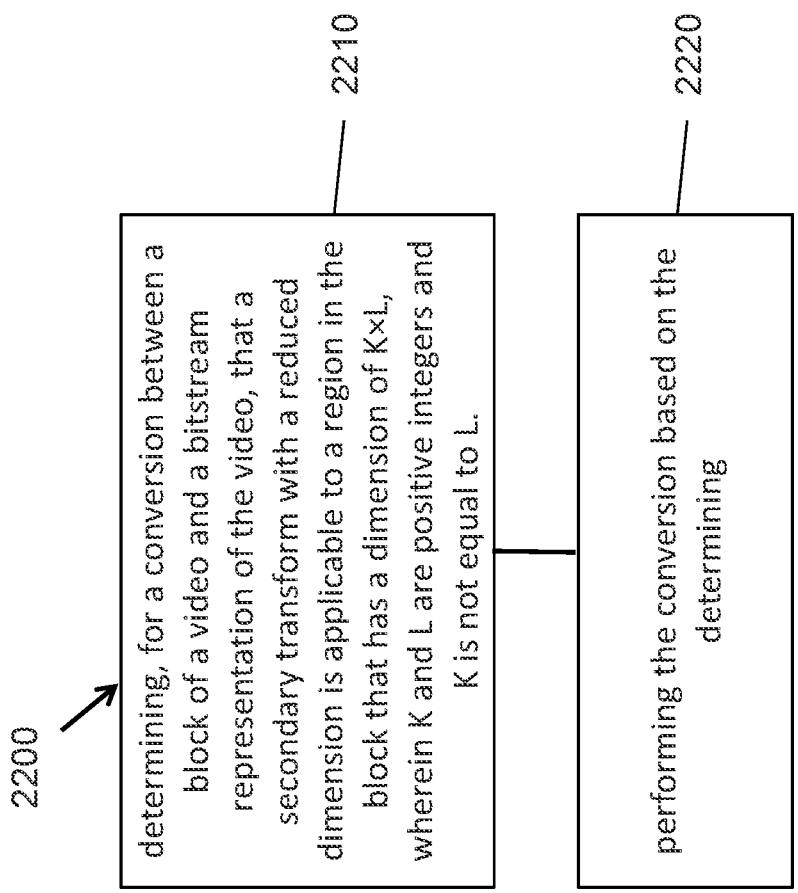
FIG. 22 is a flowchart of another example method of video processing in accordance with the present technology.

FIG. 22 is a flowchart of another example method of video processing in accordance with the present technology. The method 2200 includes, at operation 2210, determining, for a conversion between a block of a video and a bitstream representation of the video, that a secondary transform with a reduced dimension is applicable to a region in the block that has a dimension of K×L. K and L are positive integers and K is not equal to L. The secondary transform is performed between a forward primary transform and a quantization step or between a de-quantization step and an inverse primary transform. The reduced dimension is reduced from a dimension of the block. The method 2200 also includes, at operation 2220, performing the conversion based on the determining.

In some embodiments, the reduced dimension corresponds to a dimension of the region. In some embodiments, coefficients of the region that are outside of a non-zero range are set to zero. In some embodiments, the non-zero range is represented as a top-left region in the block, the top-left region having a dimension of M×M, M being smaller or equal to K and L.

Figure 23:
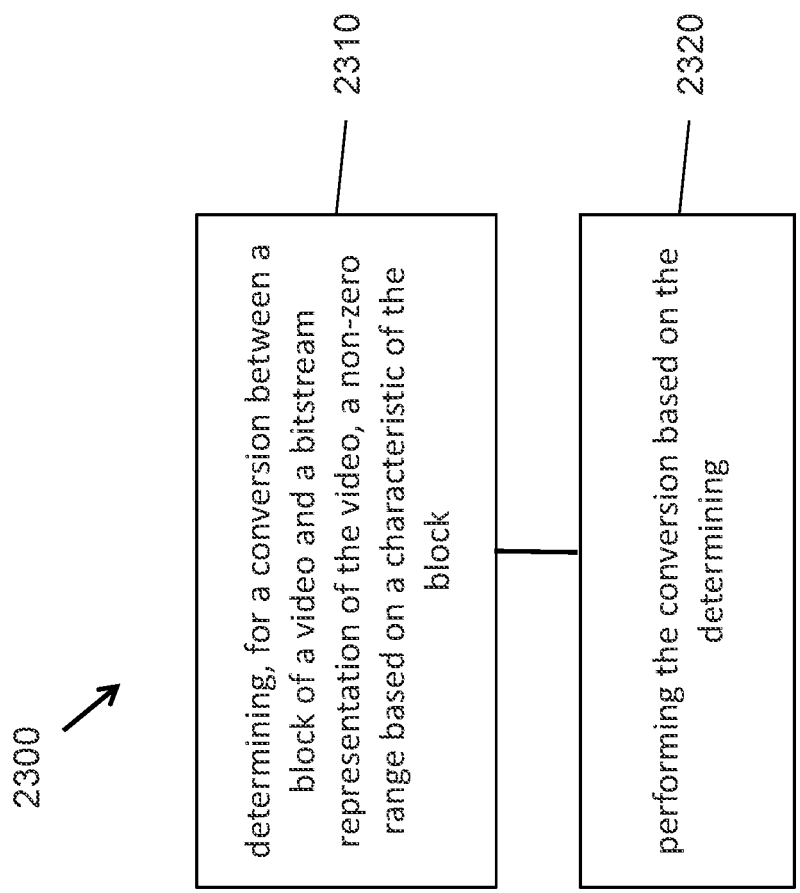
FIG. 23 is a flowchart of another example method of video processing in accordance with the present technology.

FIG. 23 is a flowchart of another example method of video processing in accordance with the present technology. The method 2300 includes, at operation 2310, determining, for a conversion between a block of a video and a bitstream representation of the video, a non-zero range based on a characteristic of the block. The non-zero range corresponds to a range outside which coefficients associated with a secondary transform with a reduced dimension are set to zero. The secondary transform is performed between a forward primary transform and a quantization step or between a de-quantization step and an inverse primary transform. The reduced dimension is reduced from a dimension of the block. The method 2300 also includes, at operation 2320, performing the conversion based on the determining.

In some embodiments, the characteristic of the block comprises a color component of the block. In some embodiments, a first non-zero range for a luma component of the block is different than a second non-zero range for a chroma component of the block. In some embodiments, the characteristic of the block comprises coded information the block. In some embodiments, the coded information comprises information indicating whether the block is coded in an intra mode or a non-intra mode. In some embodiments, the coded information comprises information indicating whether the block is coded in an intra mode, an inter mode, an inter block copy mode. In some embodiments, the coded information comprises reference picture of motion information. In some embodiments, the characteristic of the block comprises a quantization parameter of the block. In some embodiments, a first non-zero range corresponds to a first quantization parameter and a second non-zero range corresponds to a second quantization parameter, and wherein the first non-zero range is smaller than or equal to the second non-zero range in case the first quantization parameter is greater than or equal to the second quantization parameter.

In some embodiments, different non-zero ranges are associated with different transform matrices for the secondary transform. In some embodiments, the non-zero range is signaled in the bitstream representation in a sequence parameter set, a picture parameter set, a picture header, a slice header, a tile group header, a coding tree unit (CTU) row, a CTU, or a coding unit. In some embodiments, multiple non-zero ranges are applicable to the secondary transform, and a value indicating a selection of one of the multiple non-zero ranges is signaled in the bitstream representation in a sequence parameter set, a picture parameter set, a picture header, a slice header, a tile group header, a coding tree unit (CTU) row, a CTU, or a coding unit.

In some embodiments, performing the conversion includes generating the bitstream representation based on the block of the video. In some embodiments, performing the conversion includes generating the block of the video from the bitstream representation.

Figure 24A:
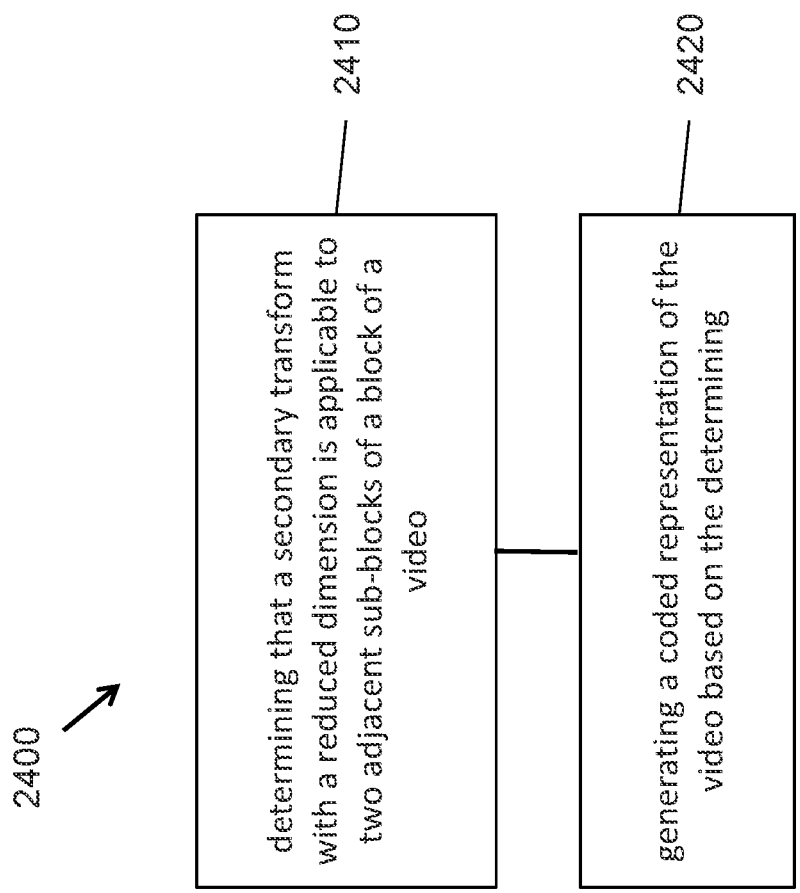
FIG. 24A is a flowchart of an example method of video encoding in accordance with the present technology.

FIG. 24A is a flowchart of an example method of video encoding in accordance with the present technology. The method 2400 includes, at operation 2410, determining that a secondary transform with a reduced dimension is applicable to two adjacent sub-blocks of a block of a video. Each of the two adjacent sub-blocks has a dimension of M×N, M and N being positive integers. The secondary transform is performed between a forward primary transform and a quantization step. The reduced dimension is reduced from a dimension of the block. The method 2400 also includes, at operation 2420, generating a coded representation of the video based on the determining.

In some embodiments, the reduced dimension corresponds to a dimension of the two adjacent blocks. In some embodiments, the method includes arranging coefficients of the two adjacent sub-blocks into a one-dimensional vector having 2×M×N elements. In some embodiments, the method includes obtaining M×N transformed elements by applying the secondary transform on the one-dimensional vector using a transform matrix. The transform matrix has a first dimension of 2×M×N elements and a second dimension of M×N elements. In some embodiments, the method includes rearranging the M×N transformed elements into a first sub-block of the two adjacent sub-blocks. In some embodiments, the method includes setting elements in a second sub-block of the two adjacent sub-blocks to zero. In some embodiments, both the forward primary transform and the secondary transform are performed on a sub-block level.

Figure 24B:
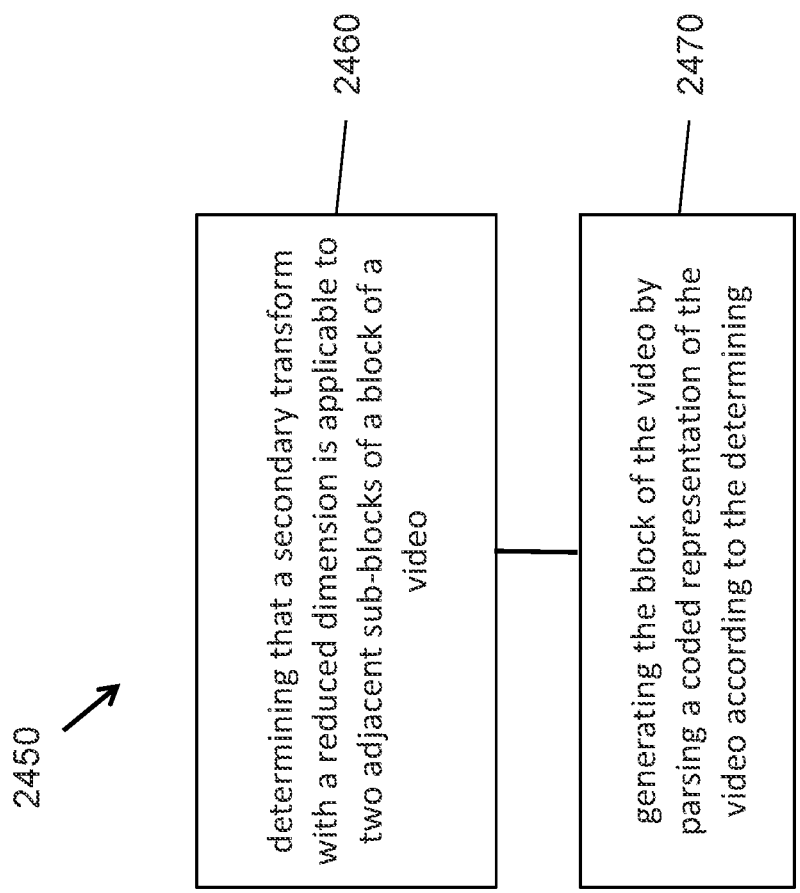
FIG. 24B is a flowchart of an example method of video decoding in accordance with the present technology.

FIG. 24B is a flowchart of an example method of video decoding in accordance with the present technology. The method 2450 includes, at operation 2460, determining that a secondary transform with a reduced dimension is applicable to two adjacent sub-blocks of a block of a video. Each of the two adjacent sub-blocks has a dimension of M×N, M and N being positive integers. The secondary transform is performed between a de-quantization step and an inverse primary transform. The reduced dimension is reduced from a dimension of the block. The method 2450 also includes, at operation 2470, generating the block of the video by parsing a coded representation of the video according to the determining.

In some embodiments, the reduced dimension corresponds to a dimension of the two adjacent blocks. In some embodiments, the method includes arranging coefficients of a first sub-block of the two adjacent sub-blocks into a one-dimensional vector having M×N elements. In some embodiments, the method includes obtaining 2×M×N transformed elements by applying the secondary transform on the one-dimensional vector using a transform matrix. The transform matrix has a first dimension of M×N elements and a second dimension of 2×M×N elements. In some embodiments, the method includes rearranging the 2×M×N transformed elements into the two adjacent sub-blocks. In some embodiments, M=N=4.

In some embodiments, the secondary transform with the reduced dimension comprises a low frequency non-separable transform, the low frequency corresponding to the reduced dimension.

Figure 25:
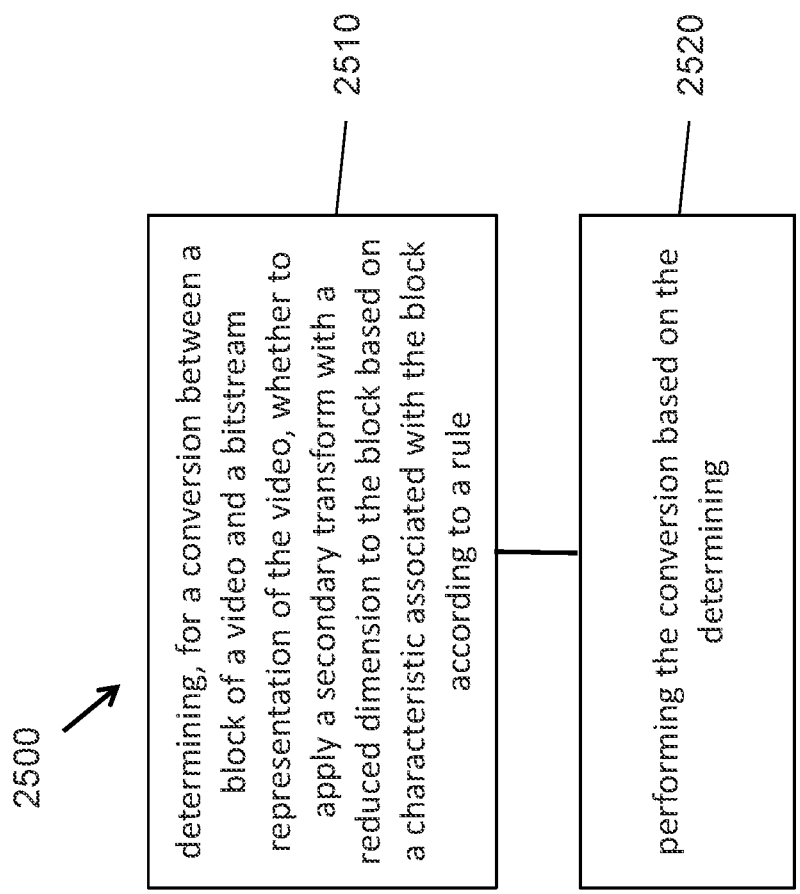
FIG. 25 is a flowchart of another example method of video processing in accordance with the present technology.

FIG. 25 is a flowchart of another example method of video processing in accordance with the present technology. The method 2500 includes, at operation 2510, determining, for a conversion between a block of a video and a bitstream representation of the video, whether to apply a secondary transform with a reduced dimension to the block based on a characteristic associated with the block according to a rule. The secondary transform is performed between a forward primary transform and a quantization step or between a de-quantization step and an inverse primary transform. The reduced dimension is reduced from a dimension of the block. The method 2500 includes, at operation 2520, performing the conversion based on the determining.

In some embodiments, the characteristic associated with the block comprises coding information of the block or coding information of a neighboring block. In some embodiments, the rule specifies that the secondary transform is not applicable to the block in case the coding information indicates that the block or the neighboring block is coded in one or more specific coding modes. In some embodiments, the one or more specific coding modes comprise at least one of: a linear mode (LM) mode, an LM-T mode, an LM-A mode, one or more wide angle intra-prediction modes, a block differential pulse-code modulation (BDPCM) mode, a differential pulse-code modulation (DPCM) mode, a residual domain block differential pulse-code modulation (RBDPCM) mode, a matrix-based intra prediction (MIP) mode, or one or more angular intra-prediction modes. In some embodiments, the rule specifies that the secondary transform is not applicable to a chroma component of the block in case the block is coded in a joint chroma residual coding mode. Coding the block in the joint chroma residual coding mode comprises determining a joint residual that is an average of residuals associated with chroma components of the block. In some embodiments, the rule specifies that the secondary transform is applicable to a luma component of the block and is inapplicable to a chroma component of the block that is coded in an LM mode, an LM-T mode, or an LM-A mode.

In some embodiments, the characteristic associated with the block comprises a coefficient or a residual of the block after the quantization or the de-quantization step. In some embodiments, the rule specifies that the secondary transform is applied to the residual in case a transform skip mode is used for coding the block. The transform skip mode is a mode in which the forward or the inverse primary transform is skipped. In some embodiments, the rule specifies that the secondary transform is applied to a quantized transformed coefficient of the block.

In some embodiments, the characteristic associated with the block comprises whether the block is coded using an intra-coding tool. In some embodiments, the rule specifies that the secondary transform is applicable to the block in case the block is coded using an inter coding tool. In some embodiments, the rule specifies that the secondary transform is applicable to the block in case the block is coded using an intra block copy coding tool. In some embodiments, the rule specifies that the secondary transform is applicable to the block in case the block is coded using a combined inter-intra prediction coding tool.

In some embodiments, the characteristic associated with the block comprises information associated with a chroma format of the block. In some embodiments, the rule specifies that the secondary transform is not applicable to a chroma component of the block. In some embodiments, the rule specifies that the secondary transform is not applicable to chroma components of the block in case the chroma format of the block is 4:0:0. In some embodiments, the rule specifies that the secondary transform is not applicable to chroma components of the block in case the chroma components of the chroma format are coded separately. In some embodiments, the rule specifies that the secondary transform is applicable to the block. A non-zero range of the secondary transform associated with a dimension of the block is determined based on color components of the block, the non-zero range being a range outside which coefficients of the block are set to zero. In some embodiments, for the same dimension of the block, a first non-zero range for a chroma component of the block is smaller than a second non-zero range for a luma component of the block.

In some embodiments, whether a Position Dependent intra Prediction Combination (PDPC) coding step is applicable to the block is determined based on whether the secondary transform is applicable. In some embodiments, the PDPC coding step is not applied in case the secondary transform is applicable to the block. In some embodiments, the PDPC coding step is applied in case the secondary transform is applicable to the block.

In some embodiments, the characteristic associated with the block comprises whether a Position Dependent intra Prediction Combination (PDPC) coding step is applicable to the block. In some embodiments, the rule specifies that the secondary transform is not applied to the block in case the PDPC coding step is applicable. In some embodiments, whether neighboring samples of the block are filtered for an intra-prediction coding step is determined based on whether the secondary transform is applicable to the block. In some embodiments, the neighboring samples are not filtered in case the secondary transform is applied to the block. In some embodiments, the neighboring samples are filtered in case the secondary transform is applied to the block.

In some embodiments, the characteristic associated with the block comprises whether neighboring samples of the block are filtered for an intra-prediction coding step applied to the block. In some embodiments, the rule specifies that the secondary transform is not applicable in case the neighboring samples are filtered. In some embodiments, the rule specifies that the secondary transform is not applicable in case the neighboring samples are not filtered.

In some embodiments, the characteristic associated with the block comprises whether the block is coded with a transform skip mode in which the forward or the inverse primary transform is skipped. In some embodiments, the block is coded with the transform skip mode, and wherein the secondary transform is applicable to the block. In some embodiments, a first transform matrix for the secondary transform in case the transform skip mode is enabled is different than a second transform matrix for the secondary transform in case the transform skip mode is disabled. In some embodiments, whether a quantization matrix is applicable to the block is determined based on whether the secondary transform is applied. In some embodiments, a first quantization matrix is applied in case the secondary transform is applicable, and wherein a second, different quantization matrix is applied in case the secondary transform is inapplicable.

In some embodiments, the characteristic associated with the block comprises whether a quantization matrix is applicable to the block. In some embodiments, the rule specifies that the secondary transform is not applicable in case the quantization matrix is applied. In some embodiments, the characteristic associated with the block comprises whether a sub-block level transform is applicable to the block. In some embodiments, the rule specifies that the secondary transform is applicable to coefficients of an upper-left sub-block of the block generated by the sub-block level transform. In some embodiments, a scanning order to parse a residue block after the quantization or the de-quantization step is determined based on whether the secondary transform is applied to the block. In some embodiments, coefficients that are set to be zero by the secondary transform are not scanned. In some embodiments, an arithmetic coding context for parsing a residue block after the quantization or the de-quantization step is determined based on whether the secondary transform is applied to the block.

In some embodiments, information related to the secondary transform is signaled in the bitstream representation at one or more levels, the one or more levels comprising a picture parameter set, a slice, header, a picture header, a tile group header, a tile, a coding tree unit row, or a coding tree unit. In some embodiments, whether the secondary transform is applicable is based on the one or more levels at which the information is signaled. In some embodiments, the information is signaled separately for a luma component and a chroma component coded within a coding tree unit. In some embodiments, one or more syntax elements related to the secondary transform are excluded in the bitstream representation of the block in case the secondary transform is not applicable to the block. In some embodiments, one or more syntax elements related to the secondary transform are signaled before a quantization transformed residue in the bitstream representation. In some embodiments, the one or more syntax elements are signaled independently from a number of coefficients determined when parsing the quantization residue. In some embodiments, the number of coefficients is not counted when parsing the quantization residue. In some embodiments, a syntax flag indicating all sub-blocks are set to zero by the secondary transform is excluded in the bitstream representation, with a value of the syntax flag implied to be 0. In some embodiments, a syntax flag indicating a coefficient is set to zero by the secondary transform is excluded in the bitstream representation, with a value of the syntax flag implied to be 0.

FIG. 26 is a flowchart of another example method of video processing in accordance with the present technology. The method 2600 includes, at operation 2610, determining, for a conversion between a block of a video and a bitstream representation of the video, a bit precision constraint for coefficients of one or more transform matrices for a secondary transform with a reduced dimension that is applicable to the block. The secondary transform is performed between a forward primary transform and a quantization step or between a de-quantization step and an inverse primary transform. The reduced dimension is reduced from a dimension of the block. The method 2600 also includes, at operation 2620, performing the conversion based on the determining.

In some embodiments, the bit precision constraint comprises that the coefficients of the one or more transform matrices are storable with a bit-width smaller than 8. In some embodiments, the bit precision constraint comprises that the coefficients of the one or more transform matrices are storable based on an association among the one or more transform matrices. In some embodiments, a difference between a first element and a second element in a transform matrix is stored, wherein the first element is derived based on the second element. In some embodiments, a difference between a first element in a first transform matrix and a second element in a second transform matrix is stored, wherein the first element is derived based on the second element. In some embodiments, the difference is represented by a bit-width smaller than 8. In some embodiments, the bit-width is 6 or 4.

In some embodiments, the secondary transform with the reduced dimension comprises a low frequency non-separable transform, the low frequency corresponding to the reduced dimension.

In some embodiments, performing the conversion includes generating the bitstream representation based on the block of the video. In some embodiments, performing the conversion includes generating the block of the video from the bitstream representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
    determining, for a conversion between a current block of a video and a bitstream of the video, that a secondary transform is applicable to the current block, wherein the secondary transform comprises at least one of a forward secondary transform and an inverse secondary transform, wherein the forward secondary transform is performed between a forward primary transform and a quantization, and the inverse secondary transform is performed between a de-quantization and an inverse primary transform;
    determining, in response to a dimension of the current block satisfying a first condition, that the secondary transform with an 8×8 secondary transform size is applicable to a first single top-left sub-block of the current block with a dimension of 8×8, and wherein the first condition requires that the dimension of the current block is W1×H1, and wherein H1≥8 and W1≥8;
    determining, in response to the dimension of the current block satisfying a second condition, that the secondary transform with a 4×4 secondary transform size is applicable to a second single top-left sub-block of the current block with a dimension of 4×4 and that no secondary transform is applied to a sub-block having a dimension of 4×4 and adjacent to the second single top-left sub-block, and wherein the second condition requires that the dimension of the current block is 4×H1 or W1×4, wherein H1>8 and W1>8; and
    performing the conversion based on the determining,
    wherein an output value from the inverse secondary transform is constrained within a first range of [min, max] inclusively, wherein min and max are integer values, and wherein min is equal to $-(1<<15)$ and max is equal to $(1<<15)-1$, and
    wherein coefficients after the de-quantization are constrained to a second range of [qmin, qmax] inclusively, wherein qmin is equal to the min of the first range and qmax is equal to the max of the first range, qmin and qmax being integers.

2. The method of claim 1, wherein a matrix for the secondary transform is selected from four transform sets, and each of the four transform sets consists of two transform matrices.

3. The method of claim 1, wherein whether to apply the secondary transform depends on a coding mode of a block,
    wherein in response to the block being coded with a transform skip mode, the secondary transform is not applied to the block, or
    wherein in response to the block being coded with a non intra prediction mode, the secondary transform is not applied to the block.

4. The method of claim 1, wherein a quantization matrix used in the de-quantization is determined based on whether the inverse secondary transform is applied or not.

5. The method of claim 1, wherein a clipping operation is applied to clip the output value within the first range of [min, max] inclusively.

6. The method of claim 1, wherein the inverse secondary transform is applied to de-quantized transformed coefficients of the current block.

7. The method of claim 1, wherein the secondary transform comprises a low frequency non-separable transform.

8. The method of claim 1, wherein the conversion includes encoding the video into the bitstream.

9. The method of claim 1, wherein the conversion includes decoding the video from the bitstream.

10. An apparatus for processing video data comprising a processor and a non-transitory memory with instructions thereon, wherein the instructions upon execution by the processor, cause the processor to:
determine, for a conversion between a current block of a video and a bitstream of the video, that a secondary transform is applicable to the current block, wherein the secondary transform comprises at least one of a forward secondary transform and an inverse secondary transform, wherein the forward secondary transform is performed between a forward primary transform and a quantization, and the inverse secondary transform is performed between a de-quantization and an inverse primary transform;
determine, in response to a dimension of the current block satisfying a first condition, that the secondary transform with an 8×8 secondary transform size is applicable to a first single top-left sub-block of the current block with a dimension of 8×8, and wherein the first condition requires that the dimension of the current block is W1×H1, and wherein H1≥8 and W1≥8;
determine, in response to the dimension of the current block satisfying a second condition, that the secondary transform with a 4×4 secondary transform size is applicable to a second single top-left sub-block of the current block with a dimension of 4×4 and that no secondary transform is applied to a sub-block having a dimension of 4×4 and adjacent to the second single top-left sub-block, and wherein the second condition requires that the dimension of the current block is 4×H1 or W1×4, wherein H1>8 and W1>8; and
perform the conversion based on the determining,
wherein an output value from the inverse secondary transform is constrained within a first range of [min, max] inclusively, wherein min and max are integer values, and wherein min is equal to −(1<<15) and max is equal to (1<<15)−1, and
wherein coefficients after the de-quantization are constrained to a second range of [qmin, qmax] inclusively, wherein qmin is equal to the min of the first range and qmax is equal to the max of the first range, qmin and qmax being integers.

11. The apparatus of claim 10, wherein a matrix for the secondary transform is selected from four transform sets, and each of the four transform sets consists of two transform matrices,
whether to apply the secondary transform depends on a coding mode of a block,
wherein in response to the block being coded with a transform skip mode, the secondary transform is not applied to the block, or
wherein in response to the block being coded with a non intra prediction mode, the secondary transform is not applied to the block, and
wherein the secondary transform comprises a low frequency non-separable transform.

12. The apparatus of claim 10, wherein a quantization matrix used in the de-quantization is determined based on whether the inverse secondary transform is applied or not, wherein a clipping operation is applied to clip the output value within the first range of [min, max] inclusively, and
wherein the inverse secondary transform is applied to de-quantized transformed coefficients of the current block.

13. The apparatus of claim 10, wherein the conversion includes encoding the video into the bitstream.

14. The apparatus of claim 10, wherein the conversion includes decoding the video from the bitstream.

15. A non-transitory computer-readable storage medium storing instructions that cause a processor to:
determine, for a conversion between a current block of a video and a bitstream of the video, that a secondary transform is applicable to the current block, wherein the secondary transform comprises at least one of a forward secondary transform and an inverse secondary transform, wherein the forward secondary transform is performed between a forward primary transform and a quantization, and the inverse secondary transform is performed between a de-quantization and an inverse primary transform;
determine, in response to a dimension of the current block satisfying a first condition, that the secondary transform with an 8×8 secondary transform size is applicable to a first single top-left sub-block of the current block with a dimension of 8×8, and wherein the first condition requires that the dimension of the current block is W1×H1, and wherein H1≥8 and W1≥8;
determine, in response to the dimension of the current block satisfying a second condition, that the secondary transform with a 4×4 secondary transform size is applicable to a second single top-left sub-block of the current block with a dimension of 4×4 and that no secondary transform is applied to a sub-block having a dimension of 4×4 and adjacent to the second single top-left sub-block, and wherein the second condition requires that the dimension of the current block is 4×H1 or W1×4, wherein H1>8 and W1>8; and
perform the conversion based on the determining,
wherein an output value from the inverse secondary transform is constrained within a first range of [min, max] inclusively, wherein min and max are integer values, and wherein min is equal to −(1<<15) and max is equal to (1<<15)−1, and
wherein coefficients after the de-quantization are constrained to a second range of [qmin, qmax] inclusively, wherein qmin is equal to the min of the first range and qmax is equal to the max of the first range, qmin and qmax being integers.

16. The non-transitory computer-readable storage medium of claim 15, wherein a matrix for the secondary transform is selected from four transform sets, and each of the four transform sets consists of two transform matrices,
whether to apply the secondary transform depends on a coding mode of a block,
wherein in response to the block being coded with a transform skip mode, the secondary transform is not applied to the block, or
wherein in response to the block being coded with a non intra prediction mode, the secondary transform is not applied to the block, and
wherein the secondary transform comprises a low frequency non-separable transform.

17. The non-transitory computer-readable storage medium of claim 15,
wherein a quantization matrix used in the de-quantization is determined based on whether the inverse secondary transform is applied or not,
wherein a clipping operation is applied to clip the output value within the first range of [min, max] inclusively, and
wherein the inverse secondary transform is applied to de-quantized transformed coefficients of the current block.

18. A non-transitory computer-readable recording medium storing a bitstream of a video which is generated by a method performed by a video processing apparatus, wherein the method comprises:
determining that a secondary transform is applicable to a current block of the video, wherein the secondary transform comprises at least one of a forward secondary transform and an inverse secondary transform, wherein the forward secondary transform is performed between a forward primary transform and a quantization, and the inverse secondary transform is performed between a de-quantization and an inverse primary transform;
determining, in response to a dimension of the current block satisfying a first condition, that the secondary transform with an 8×8 secondary transform size is applicable to a first single top-left sub-block of the current block with a dimension of 8×8, and wherein the first condition requires that the dimension of the current block is W1×H1, and wherein H1≥8 and W1≥8;
determining, in response to the dimension of the current block satisfying a second condition, that the secondary transform with a 4×4 secondary transform size is applicable to a second single top-left sub-block of the current block with a dimension of 4×4 and that no secondary transform is applied to a sub-block having a dimension of 4×4 and adjacent to the second single top-left sub-block, and wherein the second condition requires that the dimension of the current block is 4×H1 or W1×4, wherein H1>8 and W1>8; and
generating the bitstream of the video based on the determining,
wherein an output value from the inverse secondary transform is constrained within a first range of [min, max] inclusively, wherein min and max are integer values, and wherein min is equal to $-(1<<15)$ and max is equal to $(1<<15)-1$, and
wherein coefficients after the de-quantization are constrained to a second range of [qmin, qmax] inclusively, wherein qmin is equal to the min of the first range and qmax is equal to the max of the first range, qmin and qmax being integers.

19. The non-transitory computer-readable recording medium of claim 18,
wherein a matrix for the secondary transform is selected from four transform sets, and each of the four transform sets consists of two transform matrices,
whether to apply the secondary transform depends on a coding mode of a block,
wherein in response to the block being coded with a transform skip mode, the secondary transform is not applied to the block, or
wherein in response to the block being coded with a non intra prediction mode, the secondary transform is not applied to the block, and
wherein the secondary transform comprises a low frequency non-separable transform.

20. The non-transitory computer-readable recording medium of claim 18,
wherein a quantization matrix used in the de-quantization is determined based on whether the inverse secondary transform is applied or not,
wherein a clipping operation is applied to clip the output value within the first range of [min, max] inclusively, and
wherein the inverse secondary transform is applied to de-quantized transformed coefficients of the current block.

* * * * *